United States Patent
Shimbo

[11] Patent Number: 6,088,453
[45] Date of Patent: Jul. 11, 2000

[54] SCHEME FOR COMPUTING MONTGOMERY DIVISION AND MONTGOMERY INVERSE REALIZING FAST IMPLEMENTATION

[75] Inventor: Atsushi Shimbo, Tokyo, Japan

[73] Assignee: Kabushiki Kaisha Toshiba, Kawasaki, Japan

[21] Appl. No.: 09/013,209

[22] Filed: Jan. 26, 1998

[30] Foreign Application Priority Data

Jan. 27, 1997 [JP] Japan ................................. 9-012667

[51] Int. Cl.$^7$ .............................. H04L 9/28; G06F 7/52; G06F 15/00
[52] U.S. Cl. .............................. 380/28; 713/100; 708/654
[58] Field of Search .............................. 713/100; 380/28; 708/135, 211, 490, 491, 492, 523, 625, 653, 654, 655, 656; 712/14

[56] References Cited

U.S. PATENT DOCUMENTS

| 5,227,978 | 7/1993 | Kato .................................. 364/474.31 |
| 5,321,752 | 6/1994 | Iwamura et al. .......................... 380/24 |
| 5,499,299 | 3/1996 | Takenaka et al. ........................ 380/28 |
| 5,666,419 | 9/1997 | Yamamoto et al. ....................... 380/28 |
| 5,724,279 | 3/1998 | Benaloh et al. ......................... 364/746 |
| 5,805,703 | 9/1998 | Crandall .................................... 380/30 |

OTHER PUBLICATIONS

Peter L. Montgomery, "Modular Multiplication Without Trial Division", Mathematics of Computation, vol. 44, No. 170, Apr., 1985, pp. 519–521.

Burton S. Kaliski Jr., "The Montgomery Inverse And Its Applications", IEEE Transactions on Computers, vol. 44, No. 8, Aug. 1995, pp. 1064–1065.

Tetsutaro Kobayashi, et al., "Modular Inverse Algorithm Optimized By Initial Operations", Technical Report of IEICE, ISEC97–48, Nov., 1997, pp. 13–23.

*Primary Examiner*—Tod R. Swann
*Assistant Examiner*—Justin T. Darrow
*Attorney, Agent, or Firm*—Oblon, Spivak, McClelland, Maier & Neustadt, P.C.

[57] ABSTRACT

A scheme for performing high speed Montgomery division within the Montgomery space. Montgomery division $Y = B \cdot A^{-1} \cdot 2^n \mod N$ for a positive integer N, a positive integer A which is relatively prime with respect to N and satisfying $0 \leq A \leq N$, a positive integer B, and an integer n which is satisfying $n \geq L$ where L is a bit length of N in binary expression, is performed by obtaining a Montgomery inverse $X = A^{-1} \cdot 2^{2n} \mod N$ from inputs A and N, and obtaining the Montgomery division $Y = B \cdot X \cdot 2^{-n} \mod N$ from the Montgomery inverse X and inputs B and N. Montgomery inverse $X = A^{-1} \cdot 2^{2n} \mod N$ for a positive integer N, a positive integer A which is relatively prime with respect to N and satisfying $0 \leq A < N$, and an integer n which satisfies $n \geq L$ where L is a bit length of N in binary expression, is determined by obtaining an intermediate result $C = A^{-1} \cdot 2^k \mod N$ and a parameter k satisfying $L \leq k \leq 2L$ from inputs A and N, and obtaining the Montgomery inverse $X = C \cdot 2^{2n-k} \mod N$ from the intermediate result C and the parameter k and input N.

43 Claims, 22 Drawing Sheets

FIG. 1

| | Zp | MONTGOMERY SPACE |
|---|---|---|
| DOMAIN | INTEGER IN [0,p-1] | INTEGER IN [0,p-1] |
| ELEMENT | $a = AR^{-1} \bmod p$ | $A = aR \bmod p$ |
| INVERSE | x satisfying $ax = 1 \bmod p$ | x satisfying $Ax = R^2 \bmod p$ |
| ADDITION | $a+b \bmod p$ | $A+B \bmod p$ |
| SUBTRACTION | $a-b \bmod p$ | $A-B \bmod p$ |
| MULTIPLICATION | $ab \bmod p$ | $ABR^{-1} \bmod p$ |
| DIVISION | $b/a = ba^i \bmod p$ (where $a^i$ is an inverse of a) | $B/A = BA^i R^{-1} \bmod p$ (where $A^i$ is an inverse of A) |

FIG. 2A $A = a2^n \mod p$
$p = 23$ ($n = 5$)

| a | A |
|---|---|
| 0 | 0 |
| 1 | 9 |
| 2 | 18 |
| 3 | 4 |
| 4 | 13 |
| 5 | 22 |
| 6 | 8 |
| 7 | 17 |
| 8 | 3 |
| 9 | 12 |
| 10 | 21 |
| 11 | 7 |
| 12 | 16 |
| 13 | 2 |
| 14 | 11 |
| 15 | 20 |
| 16 | 6 |
| 17 | 15 |
| 18 | 1 |
| 19 | 10 |
| 20 | 19 |
| 21 | 5 |
| 22 | 14 |

FIG. 2B $ax = 1 \mod p$
$p = 23$ ($n = 5$)

| a | x |
|---|---|
| 1 | 1 |
| 2 | 12 |
| 3 | 8 |
| 4 | 6 |
| 5 | 14 |
| 6 | 4 |
| 7 | 10 |
| 8 | 3 |
| 9 | 18 |
| 10 | 7 |
| 11 | 21 |
| 12 | 2 |
| 13 | 16 |
| 14 | 5 |
| 15 | 20 |
| 16 | 13 |
| 17 | 19 |
| 18 | 9 |
| 19 | 17 |
| 20 | 15 |
| 21 | 11 |
| 22 | 22 |

FIG. 2C $AX = 2^{2n} \mod p$
$p = 23$ ($n = 5$)

| A | X |
|---|---|
| 1 | 12 |
| 2 | 6 |
| 3 | 4 |
| 4 | 3 |
| 5 | 7 |
| 6 | 2 |
| 7 | 5 |
| 8 | 13 |
| 9 | 9 |
| 10 | 15 |
| 11 | 22 |
| 12 | 1 |
| 13 | 8 |
| 14 | 14 |
| 15 | 10 |
| 16 | 18 |
| 17 | 21 |
| 18 | 16 |
| 19 | 20 |
| 20 | 19 |
| 21 | 17 |
| 22 | 11 |

FIG. 9A

|        | INITIAL VALUE | 1ST LOOP | 2ND LOOP | 3RD LOOP | 4TH LOOP |
|--------|---------------|----------|----------|----------|----------|
| U(=p)  | 10111         | 00010    | 00001    | 00001    | 00001    |
| V(=A)  | 10011         | 10011    | 10011    | 01001    | 00100    |
| T      | 0             | 1        | 1        | 10       | 100      |
| S      | 1             | 10       | 100      | 101      | 111      |
| k      | 0             | 1        | 2        | 3        | 4        |

FIG. 9B

|        | 5TH LOOP | 6TH LOOP | 7TH LOOP | OUTPUT VALUE |
|--------|----------|----------|----------|--------------|
| U(=p)  | 00001    | 00001    | 00001    |              |
| V(=A)  | 00010    | 00001    | 00000    |              |
| T      | 1000     | 10000    | 100000   | 1110         |
| S      | 111      | 111      | 10111    |              |
| k      | 5        | 6        | 7        | 7            |

FIG. 9C

|                |                | T      |
|----------------|----------------|--------|
| INITIAL VALUE  |                | 1110   |
| 1ST LOOP       | LEFT SHIFTING  | 11100  |
|                | SUBTRACTING p  | 101    |
| 2ND LOOP       | LEFT SHIFTING  | 1010   |
| 3RD LOOP       | LEFT SHIFTING  | 10100  |

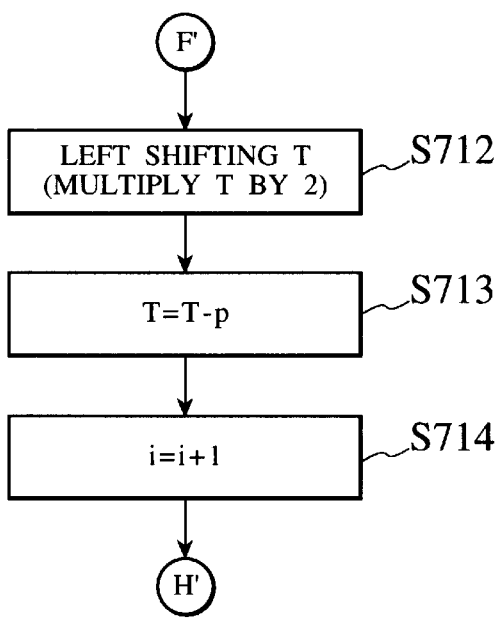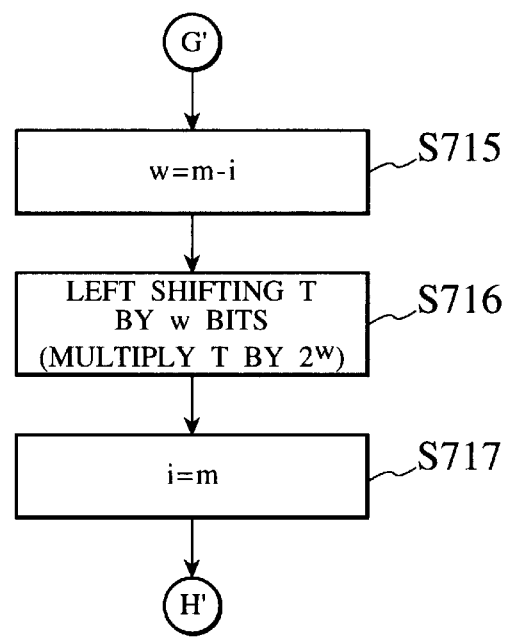

SCHEME FOR COMPUTING MONTGOMERY DIVISION AND MONTGOMERY INVERSE REALIZING FAST IMPLEMENTATION

BACKGROUND OF THE INVENTION

1. Field of the Invention

The present invention relates to a scheme for computing Montgomery division and Montgomery inverse to be used in processing that repeatedly utilizes multiple-precision arithmetic operations modulo an odd integer, such as that of public key cryptosystem which is utilized for data encryption and correspondent authentication in data communications on computer networks.

2. Description of the Background Art

Information communications networks and computer systems require exchanges and storing of electronic information, and when such a system becomes large scale so that unspecified many users utilize such a system, there arises problems of eavesdropping or alteration of information by a malicious user. As a measure against such a malicious user, the public key cryptosystem technique is often employed.

Public key cryptosystem is mostly realized in terms of arithmetic operations modulo a multiple-precision odd integer, and their fast implementation can affect a performance of the public key crypstosystem. Among arithmetic operations modulo a multiple-precision odd integer, multiplications and divisions have particularly large influences on processing time. As for multiplications, there is a computational algorithm suitable for a case of repeatedly executing multiplications, called Montgomery method. For details, see Reference (1): P. L. Montgomery, "Modular multiplication without trial division", Mathematics of Computation, Vol. 44, No. 170, pp. 519–521 (1985).

The Montgomery method is a method for computing multiple-precision modular multiplication by a processing amount of about two multiple-precision multiplications. Multiple-precision modular reduction usually has a poorer performance compared with multiple-precision multiplication so that it is possible to realize that much faster implementation. This Montgomery method is a multiplication algorithm for elements in Montgomery space (which define the same integers modulo p), where two numbers to be multiplied are converted into the Montgomery space first, then the Montgomery multiplication is carried out, and finally the result is inversely converted from the Montgomery space to original integers modulo p. Each of the Montgomery conversion and the inverse Montgomery conversion requires a processing amount of about one multiple-precision multiplication, so that modular exponentiation suffers less overhead due to the Montgomery conversion and the inverse Montgomery conversion because it carries out modular multiplications repeatedly and therefore it can be realized by a fast implementation.

Since many public key cryptosystems including RSA (Rivest-Shamir-Adleman) cryptosystem are using modular exponentiation $c=m^e$ mod N as their basic operation, the Montgomery method can be effectively utilized for them (although the Montgomery method may not necessarily lead to efficient implementation in cases where only some multiplications are required because of the overhead due to the Montogomery conversion and the inverse Montgomery conversion).

Now, in recent years, various new crypstosystems have been studied and proposed, and in particular the elliptic curve cryptosystem has been attracting much attentions among public key cryptosystems. This elliptic curve cryptosystem is based on a conjecture that the problem of discrete logarithm over elliptic curves is more difficult to solve computationally than the factorization of composites on which the RSA cryptosystem is based.

Here, basic operations in the elliptic curve cryptosystem will be described briefly.

In finite field Fp (p>3), curves defined by:

$$E(a, b)/\text{Fp}: y^2 = x^3 + ax + b \bmod p$$

where a and b are integers for which $0 \leq a, b < p$ and $4a^3 + 27b^2 \neq 0 \bmod p$, are called elliptic curves in finite field Fp. Points on eplliptic curves are defined to be sets (x, y) that satisfy the above equation (where x and y are integers for which $0 \leq x, y < p$) plus a point at infinity 0. This point at infinity 0 serves as a unit element for addition.

Points on elliptic curves form a group for addition as follows. Namely, a sum $S(x_3, y_3)$ of points $P=(x_1, y_1)$ and $Q=(X_2, y_2)$ on elliptic curves can be given by the following, where $-P=(x_1, -y_1)$.

(1) When Q is a unit element 0:

$$S=P+Q=Q+P=P$$

(2) When $Q=-P$:

$$S=P+Q=Q+P=0$$

(3) When $P \neq Q$ (other than (1) and (2)):

$$x_3 = (y_2-y_1)^2/(x_2-x_1)^2 - x_1 - x_2 \bmod p$$

$$y_3 = (y_2-y_1)(x_1-x_3)/(x_2-x_1) - y_1 \bmod p$$

(4) When P=Q:
 if $y1 \neq 0$:

$$x_3 = (3x_1^2+a)^2/(2y_1)^2 - 2x_1 \bmod p$$

$$y_3 = (3x_1^2+a)(x_1-x_3)/(2y_1) - y_1 \bmod p$$

if $y_1=0$:
 $S=0$

Also, an e (integer) multiple of a point $(x_1, y_1)$ on elliptic curves is defined as iterations of the above described addition by the following.

$$eP = P+P+ \ldots +P \text{ (P is added } e \text{ times)}$$

Note however that when e<0, an (−e) multiple of a point (−P) is to be calculated (where (−e) is a positive), and when e=0, it is set that 0P=0.

In the elliptic curve cryptosystem, the basic operation is a scalar multiple operation (iteration of additions) of a point on elliptic curves. This operation occupies the major part of the processing required in elliptic El Gamal cryptosystem, elliptic El Gamal Signature scheme, and elliptic DH (Diffie-Hellman) scheme, for example.

Thus, in contrast to the RSA cryptosystem which uses modular multiplication as the basic operation, the elliptic curve cryptosystem require four arithmetic operations in order to realize its basic operation.

Now, when the basic operation is iterated processing of multiple-precision arithmetic operations as in the elliptic curve cryptosystem, processing time consuming operations among arithmetic operations are modular multiplication and modular division so that it is necessary to realize a fast impelmentation of these modular multiplication and modular division in order to realize a fast implementation of the entire cryptographic processing. Of these, the modular multiplication can be realized by a fast implementation using the Montgomery multiplication algorithm of the above noted Reference (1), for example.

On the other hand, the modular division can be realized as a combination of (multiplicative) inverse calculation and modular multiplication, and in general an inverse can be calculated by a method called extended Euclidean division algorithm. However, this algorithm is not very fast in general. As a fast inverse calculation scheme, there is a conventionally known scheme using multiple-precision ingeter right-shift (multiplication by ½), addition and subtraction. For details, see Reference (2): B. S. Kaliski Jr., "The Montgomery Inverse and Its Application", IEEE Transactions on Computers, Vol. 44, No. 8, pp. 1064–1065 (August 1995).

However, the Montgomery multiplication of the Reference (1) and the fast modular division calculation scheme of the Reference (2) cannot be directly utilized because it would then become necessary to carry out the Montgomery conversion and the inverse Montgomery conversion between the Montgomery space and original integers modulo p every time a multiplication or a division is to be carried out and this requirement in turn would cause a very large overhead.

Moreover, there has been no known algorithm that can efficiently calculate modular division in the Montgomery space.

Thus it has conventionally been difficult to realize a fast implementation of modular division, and consequently it has conventionally difficult to realize a fast implementation of cryptographic processing in which the basic operation is iterated processing of arithmetic operations (modular arithmetic) as in the case of elliptic curve cryptosystems.

As described, there has been no known scheme for efficiently realizing iterated processing of operations including modular multiplication and modular division, and it has conventionally been difficult to realize an efficient implementation of the entire processing for elliptic curve cryptosystem and the like.

SUMMARY OF THE INVENTION

It is therefore an object of the present invention to provide a scheme for computing Montgomery division and Montgomery inverse, which is capable of obtaining Montgomery division and Montgomery inverse in the Montgomery space at high speed.

According to one aspect of the present invention there is provided a Montgomery division device for computing a Montgomery division $Y=B \cdot A^{-1} \cdot 2^n$ mod N for a positive integer N, a positive integer A which is relatively prime with respect to N and satisfying $0 \leq A < N$, a positive integer B, and an integer n which is satisfying $n \geq L$ where L is a bit length of N in binary expression, the device comprising: a Montgomery inverse calculation unit for obtaining a Montgomery inverse $X=A^{-1} \cdot 2^{2n}$ mod N from inputs A and N; and a Montgomery multiplication unit for obtaining the Montgomery division $Y=B \cdot X \cdot 2^{-n}$ mod N from the Montgomery inverse X obtained by the Montgomery inverse calculation unit and inputs B and N.

According to another aspect of the present invention there is provided a Montgomery division device for computing a Montgomery division $Y=B \cdot A^{-1} \cdot 2^n$ mod N for a positive integer N, a positive integer A which is relatively prime with respect to N and satisfying $0 \leq A \leq N$, a positive integer B, and an integer n which is satisfying $n \geq L$ where L is a bit length of N in binary expression, the device comprising: an inverse calculation unit for obtaining a first intermediate result $C=A^{-1} \cdot 2^k$ mod N and a parameter k satisfying $L \leq k \leq 2L$ from inputs A and N; a Montgomery multiplication unit for obtaining a second intermediate result $D=B \cdot C \cdot 2^{-n}$ mod N from the first intermediate result C obtained by the inverse calculation unit and input B and N; and an inverse correction unit for obtaining the Montgomery division $Y=D \cdot 2^{2n-k}$ mod N from the second intermediate result D obtained by the Montgomery multiplication unit, the parameter k obtained by the inverse calculation unit and input N.

According to another aspect of the present invention there is provided a Montgomery inverse calculation device for computing a Montgomery inverse $X=A^{-1} \cdot 2^{2n}$ mod N for a positive integer N, a positive integer A which is relatively prime with respect to N and satisfying $0 \leq A < N$, and an integer n which is satisfying $n \geq L$ where L is a bit length of N in binary expression, the device comprising: an inverse calculation unit for obtaining an intermediate result $C=A^{-1} \cdot 2^k$ mod N and a parameter k satisfying $L \leq k \leq 2L$ from inputs A and N; and an inverse correction unit for obtaining the Montgomery inverse $X=C \cdot 2^{2n-k}$ mod N from the intermediate result C and the parameter k obtained by the inverse calculation unit and input N.

According to another aspect of the present invention there is provided a method for computing a Montgomery division $Y=B \cdot A^{-1} \cdot 2^n$ mod N for a positive integer N, a positive integer A which is relatively prime with respect to N and satisfying $0 \leq A < N$, a positive integer B, and an integer n which is satisfying $n \geq L$ where L is a bit length of N in binary expression, the method comprising the steps of: (a) obtaining a Montgomery inverse $X=A^{-1} \cdot 2^{2n}$ mod N from inputs A and N; and (b) obtaining the Montgomery division $Y=B \cdot X \cdot 2^{-n}$ mod N from the Montgomery inverse X obtained by the step (a) and inputs B and N.

According to another aspect of the present invention there is provided a method for computing a Montgomery division $Y=B \cdot A^{-1} \cdot 2^n$ mod N for a positive integer N, a positive integer A which is relatively prime with respect to N and satisfying $0 \leq A < N$, a positive integer B, and an integer n which is satisfying $n \geq L$ where L is a bit length of N in binary expression, the method comprising the steps of: (a) obtaining a first intermediate result $C=A^{-1} \cdot 2^k$ mod N and a parameter k satisfying $L \leq k \leq 2L$ from inputs A and N; (b) obtaining a second intermediate result $D=B \cdot C \cdot 2^{-n}$ mod N from the first intermediate result C obtained by the step (a) and input B and N; and (c) obtaining the Montgomery division $Y=D \cdot 2^{2n-k}$ mod N from the second intermediate result D obtained by the step (b), the parameter k obtained by the step (a) and input N.

According to another aspect of the present invention there is provided a method for computing a Montgomery inverse $X=A^{-1} \cdot 2^{2n}$ mod N for a positive integer N, a positive integer A which is relatively prime with respect to N and satisfying $0 \leq A < N$, and an integer n which is satisfying $n \geq L$ where L is a bit length of N in binary expression, the method comprising the steps of: (a) obtaining an intermediate result $C=A^{-1} \cdot 2^k$ mod N and a parameter k satisfying $L \leq k \leq 2L$ from inputs A and N; and (b) obtaining the Montgomery inverse $X=C \cdot 2^{2n-k}$ mod N from the intermediate result C and the parameter k obtained by the step (a) and input N.

According to another aspect of the present invention there is provided an article of manufacture, comprising: a computer usable medium having computer readable program code means embodied therein for causing a computer to function as a system for computing a Montgomery division $Y=B \cdot A^{-1} \cdot 2^n$ mod N for a positive integer N, a positive integer A which is relatively prime with respect to N and satisfying $0 \leq A < N$, a positive integer B, and an integer n which is satisfying $n \geq L$ where L is a bit length of N in binary expression, the computer readable program code means includes: first computer readable program code means for causing said computer to obtain a Montgomery inverse $X=A^{-1} \cdot 2^{2n}$ mod N from inputs A and N; and second computer readable program code means for causing said computer to obtain the Montgomery division $Y=B \cdot X \cdot 2^{-n}$ mod N from the Montgomery inverse X obtained by the first computer readable program code means and inputs B and N.

According to another aspect of the present invention there is provided an article of manufacture, comprising: a computer usable medium having computer readable program code means embodied therein for causing a computer to function as a system for computing a Montgomery division $Y=B \cdot A^{-1} \cdot 2^n$ mod N for a positive integer N, a positive integer A which is relatively prime with respect to N and satisfying $0 \leq A < N$, a positive integer B, and an integer n which is satisfying $n \geq L$ where L is a bit length of N in binary expression, the computer readable program code means includes: first computer readable program code means for causing said computer to obtain a first intermediate result $C=A^{-1} \cdot 2^k$ mod N and a parameter k satisfying $L \leq k \leq 2L$ from inputs A and N; second computer readable program code means for causing said computer to obtain a second intermediate result $D=B \cdot C \cdot 2^{-n}$ mod N from the first intermediate result C obtained by the first computer readable program code means and input B and N; and third computer readable program code means for causing said computer to obtain the Montgomery division $Y=D \cdot 2^{2n-k}$ mod N from the second intermediate result D obtained by the second computer readable program code means, the parameter k obtained by the first computer readable program code means and input N.

According to another aspect of the present invention there is provided an article of manufacture, comprising: a computer usable medium having computer readable program code means embodied therein for causing a computer to function as a system for computing a Montgomery inverse $X=A^{-1} \cdot 2^{2n}$ mod N for a positive integer N, a positive integer A which is relatively prime with respect to N and satisfying $0 \leq A < N$, and an integer n which is satisfying $n \geq L$ where L is a bit length of N in binary expression, the computer readable program code means includes: first computer readable program code means for causing said computer to obtain an intermediate result $C=A^{-1} \cdot 2^k$ mod N and a parameter k satisfying $L \leq k \leq 2L$ from inputs A and N; and second computer readable program code means for causing said computer to obtain the Montgomery inverse $X=C \cdot 2^{2n-k}$ mod N from the intermediate result C and the parameter k obtained by the first computer readable program code means and input N.

According to another aspect of the present invention there is provided a method for implementing basic operations of an elliptic curve cryptosystem, comprising the steps of: converting parameters of the basic operations of the elliptic curve cryptosystem from Zp, integers modulo p, over which elliptic curves are defined, into a Montgomery space; executing the basic operations of the elliptic curve cryptosystem in terms of Montgomery arithmetic system using the parameters converted by the converting step; and inversely converting operation results of the basic operations of the elliptic curve cryptosystem obtained by the executing step from the Montgomery space into Zp.

According to another aspect of the present invention there is provided a method for implementing basic operations of an elliptic curve cryptosystem, comprising the steps of: defining parameters of the basic operations of the elliptic curve cryptosystem in a Montgomery space over which elliptic curves are defined; and executing the basic operations of the elliptic curve cryptosystem in terms of Montgomery arithmetic system using the parameters defined by the defining step, so as to obtain operation results for the basic operations of the elliptic curve cryptosystem in the Montgomery space.

Other features and advantages of the present invention will become apparent from the following description taken in conjunction with the accompanying drawings.

BRIEF DESCRIPTION OF THE DRAWINGS

FIG. 1 is a table summarizing a relationship between two algebraic systems of Zp and the Montgomery space used in the present invention.

FIG. 2A is a table showing a concrete example of a correspondence between elements of Zp and the Montgomery space.

FIG. 2B is a table showing a concrete example of a correspondence between elements and inverses in Zp.

FIG. 2C is a table showing a concrete example of a correspondence between elements and inverses in the Montgomery space.

FIGS. 9A and 9B are tables showing a concrete example of transition of register values used in the inverse calculation unit during the processing procedure of FIGS. 7A to 7E.

FIG. 9C is a table showing a concrete example of transition of a register value used in the inverse correction unit during the processing procedure of FIG. 8.

FIGS. 11A, 11B and 11C are a flow chart for another exemplary processing procedure for an inverse correction unit in the Montgomery inverse calculation device of FIG. 6.

DETAILED DESCRIPTION OF THE PREFERRED EMBODIMENTS

Figure 3:
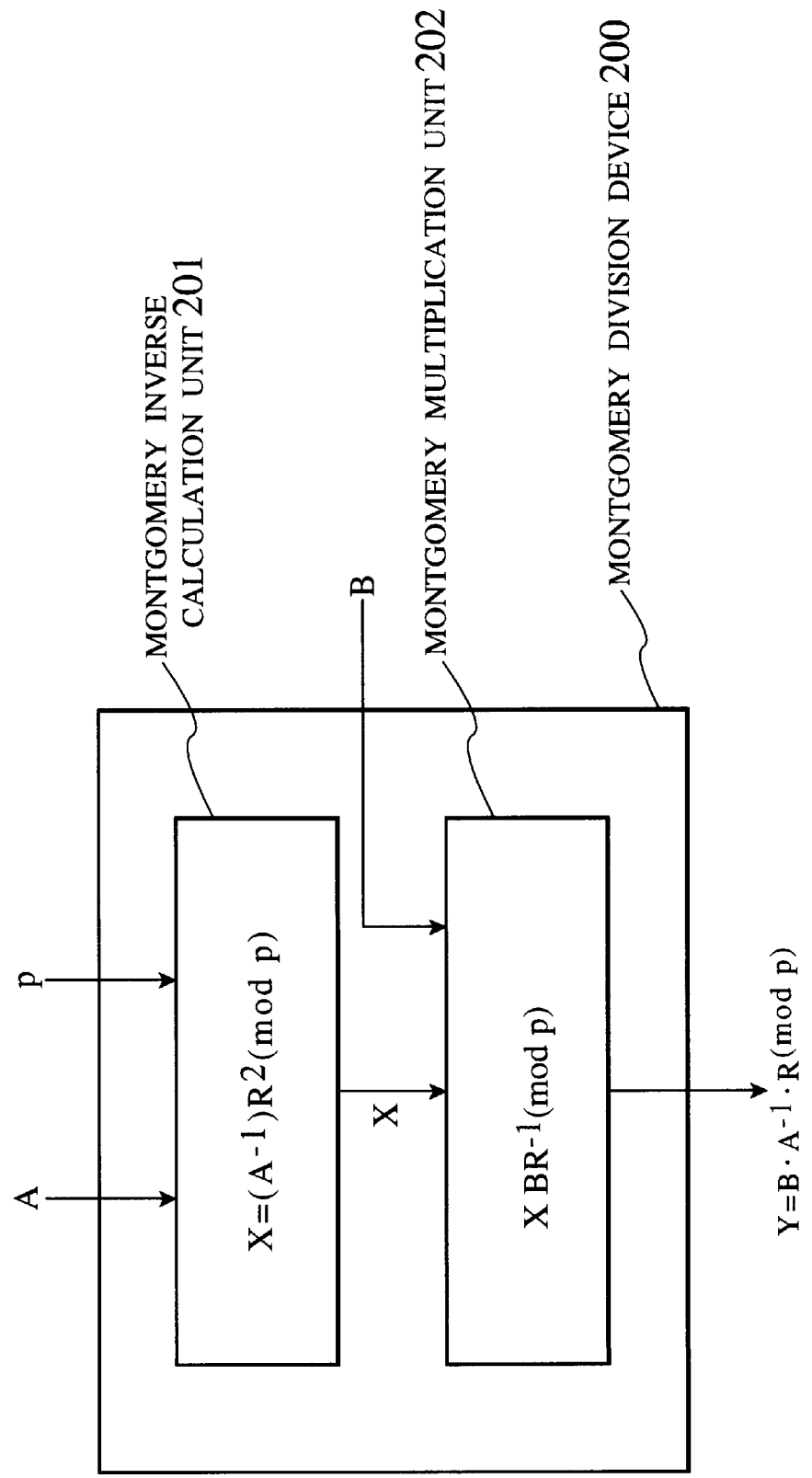
FIG. 3 is a block diagram showing a basic configuration of a Montgomery division device according to the present invention.

Referring now to FIG. 1 to FIG. 18, one embodiment of a scheme for computing Montgomery division and Montgomery inverse according to the present invention will be described in detail. In the following, for integers s and u, s mod u indicates a residue obtained when s is divided by u.

As already mentioned above, it is known that multiplications in the Montgomery space can be realized by a more efficient implementation than multiplications in integers modulo p in general, so that there are cases where the Montgomery multiplications are utilized in realizing iterated processing of multiplications in integers modulo p of the RSA cryptosystem and the like. However, there are other cryptosystems in which encryption and decryption require divisions and (multiplicative) inverse calculations in addition to multiplications used in the RSA cryptosystem. For example, in the elliptic curve cryptosystem, a combination of arithmetic operations in integers modulo p is used as a unit operation and the encryption/decryption algorithm is formed by iterating this unit operation for appropriate number of times.

However, there is no known efficient implementation of division and inverse calculation in the Montgomery space, and it has been difficult to realize an efficient processing utilizing the Montgomery space for cases where a unit operation is formed by a combination of arithmetic operations in integers modulo p as in the elliptic curve cryptosystem.

In view of this, the division scheme and the inverse calculation scheme of the present invention as described below are devised so that results of modular division and modular inverse calculation in the Montgomery space can be obtained efficiently.

First, a relationship between an ordinary Zp (denoting integers modulo p) and the Montgomery space, and operations in the Montgomery space will be described in detail.

FIG. 1 shows a relationship between two algebraic systems of Zp and the Montgomery space, for domain, element, inverse, and arithmetic operations of addition, subtraction, multiplication and division.

Note that a value p of the modulus is an integer, and more preferably an odd integer. Moreover, in the applications to cryptosystems, p is often chosen to be a prime number.

When a is an element in Zp, a corresponding element A in the Montgomery space is given by:

$$A = a \cdot R \bmod p$$

On the other hand, the inverse conversion from an element A in the Montgomery space to an element a in Zp is given by:

$$a = A \cdot R^{-1} \bmod p$$

where R is a parameter defining the Montgomery space, which is required to satisfy the following two conditions.

(i) R is relatively prime with respect to p (ii) R>p

In general, R is set to be a power of 2 ($R = 2^n$), and it is often set to be a multiple of a word length used in hardware. In order to limit computation range as small as possible, it is preferable to set n to be the smallest value that satisfies $n \geq L$ where L is a number of bits of the modulus p and that is a multiple of the word length. In the following description, it is assumed that n is equal to the bit length L of the modulus p for the sake of simplicity.

FIG. 2A shows an exemplary correspondence between elements a of Zp and elements A of the Montgomery space for a case of p=23, $R = 2^5$ (n=5). Note however that the modulus p actually used in the practical cryptosystem is a very large integer.

In the Montgomery division device and the Montgomery inverse calculation device of the present invention as described below, it is assumed that $R = 2^n$ is to be used.

Next, inverse calculation and arithmetic operations in the Montgomery space can be defined as indicated in FIG. 1, considering the fact that an element $A = a \cdot R \bmod p$ of the Montgomery space corresponds to an element a of Zp.

Namely, addition and subtraction in the Montgomery pace are defined as:

$$A + B \bmod p$$

$$A - B \bmod p$$

similarly as in Zp.

Montgomery multiplication is defined as follows.

$$A \cdot B \cdot R^{-1} \bmod p$$

The other operations in the Montgomery space can be defined according to Montgomery multiplication $ABR^{-1} \bmod p$ as follows.

Namely, an inverse X of an element A takes a value that gives a unit element R in the Montgomery space as a result of Montgomery multiplication of A and X. That is, an inverse X satisfies:

$$A \cdot X = R^2 \bmod p$$

Consequently, inverse calculation for A mod p in the Montgomery space is given by:

$$X = A^{-1} \cdot R^2 \bmod p$$

In the Montgomery inverse calculation device of the present invention as described below, this Montgomery inverse $X = A^{-1} \cdot R^2 \bmod p$ is efficiently obtained for given input A and modulus p.

Similarly, Montgomery division for B divided by A modulo p is given by:

$$Y = B \cdot A^{-1} \cdot R \bmod p$$
$$= B \cdot A^i \cdot R^{-1} \bmod p$$

where $A^i$ is an inverse of A in the Montgomery space.

In the Montgomery division device of the present invention as described below, this $B \cdot A^i \cdot R^{-1}$ mod p is efficiently obtained for the given inputs A and B and modulus p.

FIG. 2B shows an exemplary correspondence between elements a and inverses x in Zp for a case of p=23, $R=2^5$ (n=5), while FIG. 2C shows an exemplary correspondence between elements A and inverses X in the Montgomery space for a case of p=23, $R=2^5$ (n=5).

Now, in order to utilize these Montgomery arithmetic, the conversion from Zp to the Montgomery space is carried out first, then appropriate arithmetic processing in the Montgomery space is iterated, and then the inverse conversion from the Montgomery space to Zp is carried out. Note that each of these conversion and inverse conversion requires a processing amount of about one multiple-precision multiplication so that overhead due to them is not so large in overall perspective.

Here, some concrete examples of the use of Montgomery arithmetic will be described.

First, consider a case of obtaining an inverse x of an element a=3 in Zp by using Montgomery arithmetic, assuming that p=23 and $R=2^5$ (n=5). In this case, when the element a=3 in Zp is converted into an element A in the Montgomery space first, A=4 is obtained. Then, as an inverse X of the element A=4 in the Montgomery space, X=3 is obtained. Then, when the element X=3 in the Montgomery space is inversely converted into the element x in Zp, x=8 is obtained. Note that when the inverse x of the element a=3 in Zp is directly obtained in Zp, x=8 will be obtained, in agreement with the above described result.

Next, consider a case of calculating a multiplication 3×6 in Zp by using Montgomery arithmetic, assuming that p=23 and $R=2^5$ (n=5). In this case, elements 3 and 6 in Zp are converted into elements 4 and 8 in the Montgomery space first. Then, from $Y = 4 \times 8 \times R^{-1}$ mod p, Y=1 is obtained. Then, when this Y=1 in the Montgomery space is inversely converted, y=18 in Zp is obtained as a multiplication result. Note that when y=3×6 mod p is directly obtained in Zp, y=18 will be obtained, in agreement with the above described result.

Next, consider a case of calculating a division 6/2 in Zp by using Montgomery arithmetic, assuming that p=23 and $R=2^5$ (n=5). In this case, elements 6 and 2 in Zp are converted into elements 8 and 18 in the Montgomery space first. Then, from $Y = 8/18 \times R^{-1}$ mod p = $8 \times 16 \times R^{-1}$ mod p, Y=4 is obtained. Then, when this Y=4 in the Montgomery space is inversely converted, y=3 in Zp is obtained as a division result. Note that when y=6/2 mod p is directly obtained in Zp, y=3 will be obtained, in agreement with the above described result.

In the following, the Montgomery division device and the Montgomery inverse calculation device of the present invention will be described in detail.

FIG. 3 shows a basic configuration of the Montgomery division device according to the present invention. This Montgomery division device 200 comprises a Montgomery inverse calculation unit 201 and a Montgomery multiplication unit 202 which are to be used sequentially in computing Montgomery division.

In this embodiment, Montgomery division $Y = B \cdot A^{-1} \cdot R$ mod p is rewritten as:

$$Y = B \cdot (A^{-1} \cdot R^2) \cdot R^{-1} \bmod p$$
$$= (B \cdot (A^{-1} \cdot R^2 \bmod p)) \cdot R^{-1} \bmod p$$
$$= B \cdot X \cdot R^{-1} \bmod p$$

and according to this rewritten expression, using a number A and a modulus p as inputs, an inverse X of A in the Montgomery space is obtained by the Montgomery inverse calculation unit 201 first, then using this X, a number B and the modulus p as inputs, Montgomery multiplication $Y = B \cdot X \cdot R^{-1}$ mod p i.e. $Y = B \cdot A^{-1} \cdot R$ mod p is obtained by the Montgomery multiplication unit 202.

It is known that the Montgomery multiplication unit 202 can be realized in a faster implementation than a unit for multiplication in integers modulo p, and the known technique such as that disclosed in the above noted Reference (1) can be utilized to this effect in this embodiment.

Figure 4:
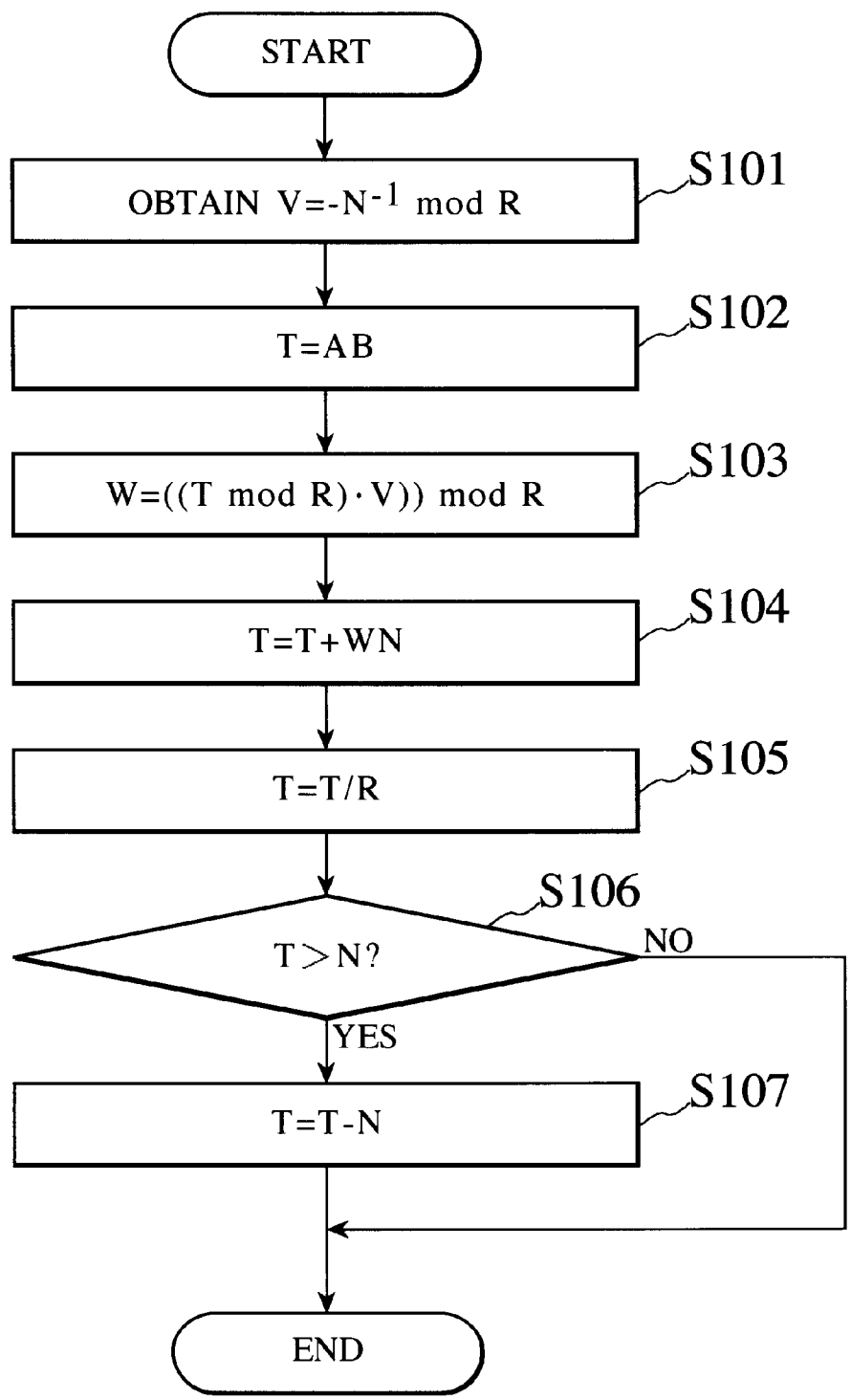
FIG. 4 is a flow chart for one exemplary processing procedure for a Montgomery multiplication unit in the Montgomery division device of FIG. 3.

FIG. 4 shows one exemplary processing procedure for the Montgomery multiplication unit 202, in a case of obtaining $A \cdot B \cdot R^{-1}$ mod N for two numbers A and B, which proceeds as follows.

First, $V = -N^{-1}$ mod R (i.e. V that satisfies $V \cdot N = -1$ mod R) is obtained (step S101), while $T = A \cdot B$ is obtained (step S102) and $W = (T \bmod p) \cdot V) \bmod R$ is obtained (step S103). Then, $T + W \cdot N$ is substituted into T (step S104) and T=T/R is calculated (step S105). Then, if T>N (step S106 YES), N is subtracted from T (step S107). The resulting T is a result of Montgomery multiplication of A and B modulo N. Note that when R is set to be a power of 2, modular reduction and division can be realized as left and right shifting binary algorithms. Also, by calculating a value of V modulo N in advance, it is possible to improve the efficiency of the processing.

Figure 5:
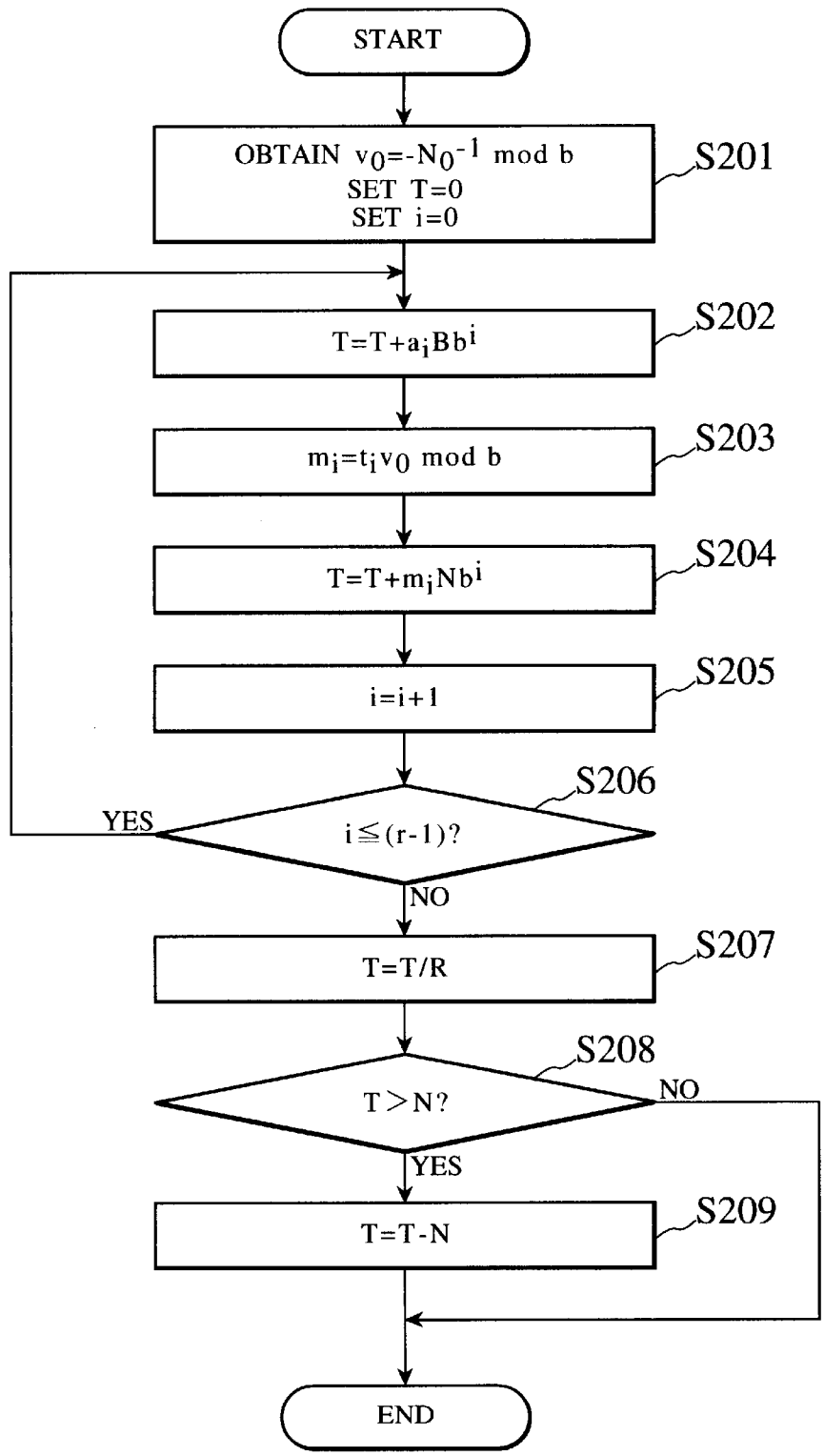
FIG. 5 is a flow chart for another exemplary processing procedure for a Montgomery multiplication unit in the Montgomery division device of FIG. 3.

FIG. 5 shows another exemplary processing procedure for the Montgomery multiplication unit 202, in a case of obtaining $A \cdot B \cdot R^{-1}$ mod N for two numbers A and B. This is a modification of the processing procedure of FIG. 4 in which a required amount of processing is reduced to about two multiple-precision multiplications. Here it is assumed that A, B and B are expressed in terms of a base b. For example, an expression of a form $A = a_{r-1} b^{r-1} + a_{r-2} b^{r-2} + \ldots + a_1 b + a_\emptyset$ can be used. Here the base b is assumed to be a power of 2, such as $2^8$ or $2^{16}$ for example. It is obviously also possible to use b=2. This processing procedure proceeds as follows.

First, $v_\emptyset = -N_\emptyset^{-1}$ mod R (i.e. $v_\emptyset$ that satisfies $v_\emptyset \cdot N_\emptyset = -1$ mod R) is obtained while variables T and i are initially set to be T=0 and i=0 (step S201). Then, $T + a_i B b^i$ is substituted into T (step S202) and $m_i = t_i \, v_\emptyset$ mod b is obtained (step S203). Then, $T + m_i \, N b^i$ is substituted into T (step S204) and i is incremented by one (step S205). If $i \leq (r-1)$ at this point (step S206 YES) the processing returns to the step S202. If i>(r-1) (step S206 NO), the processing gets out of the loop, and T=T/R is calculated (step S207). Then, if T>N (step S208 YES), N is subtracted from T (step S209). The resulting T is a result of Montgomery multiplication of A and B modulo N.

One of the features of this procedure of FIG. 5 is that lower L blocks of T all become 0 (that is T becomes a multiple of R) immediately before the step S207 is carried out. Consequently, it is possible to reduce a working region. Note that modular multiplication can be realized as left shifting binary algorithm. Also, by calculating a value of $v_\emptyset$ modulo N in advance, it is possible to improve the efficiency of the processing.

As described, the Montgomery multiplication unit 202 can be realized efficiently. Also, as described in detail below, the Montgomery inverse calculation unit 201 can also be realized efficiently according to the present invention. Consequently, the Montgomery division device 200 of the present invention can carry out Montgomery division efficiently.

Figure 6:
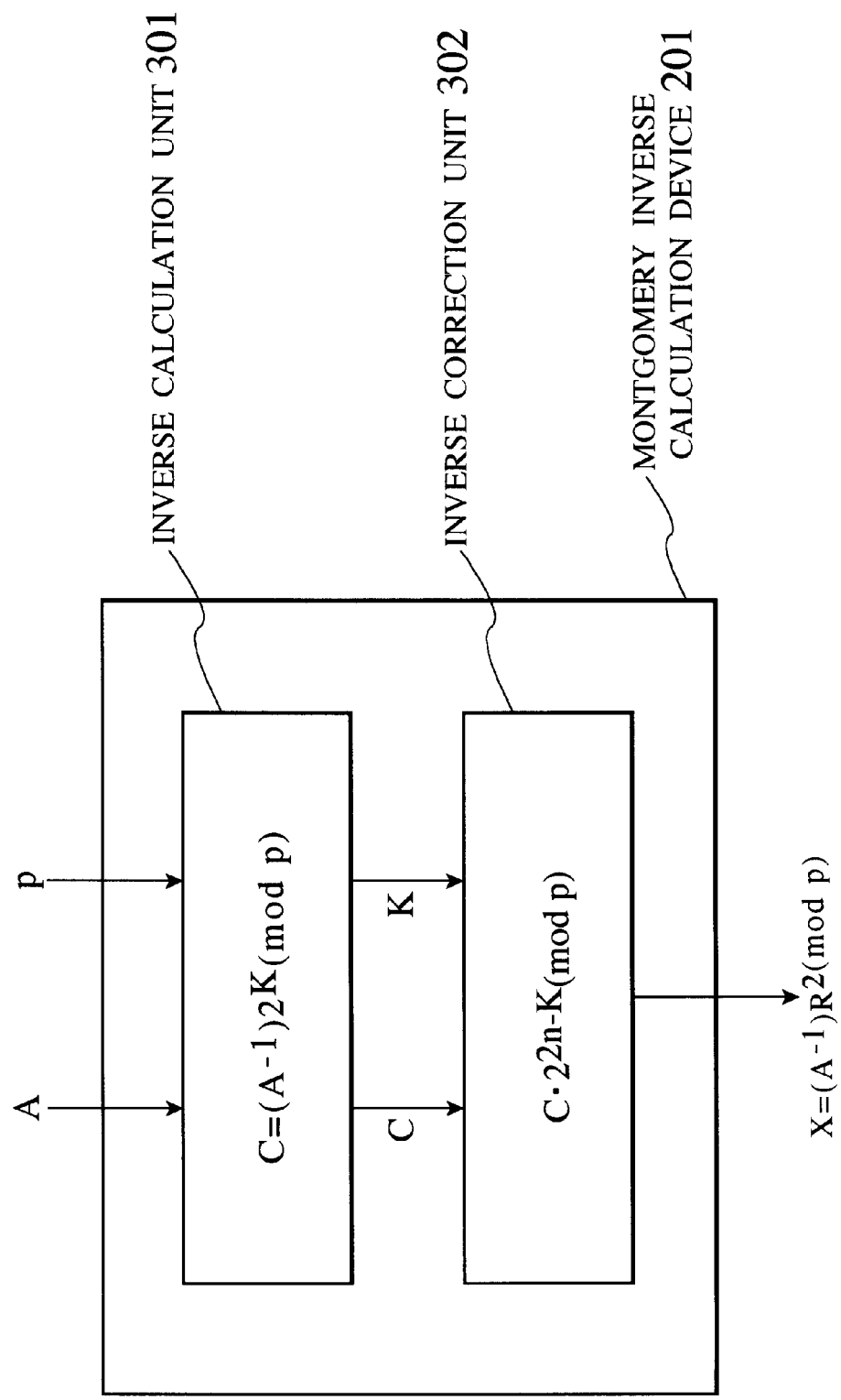
FIG. 6 is a block diagram showing a basic configuration of a Montgomery inverse calculation device according to the present invention.
Figure 7A:
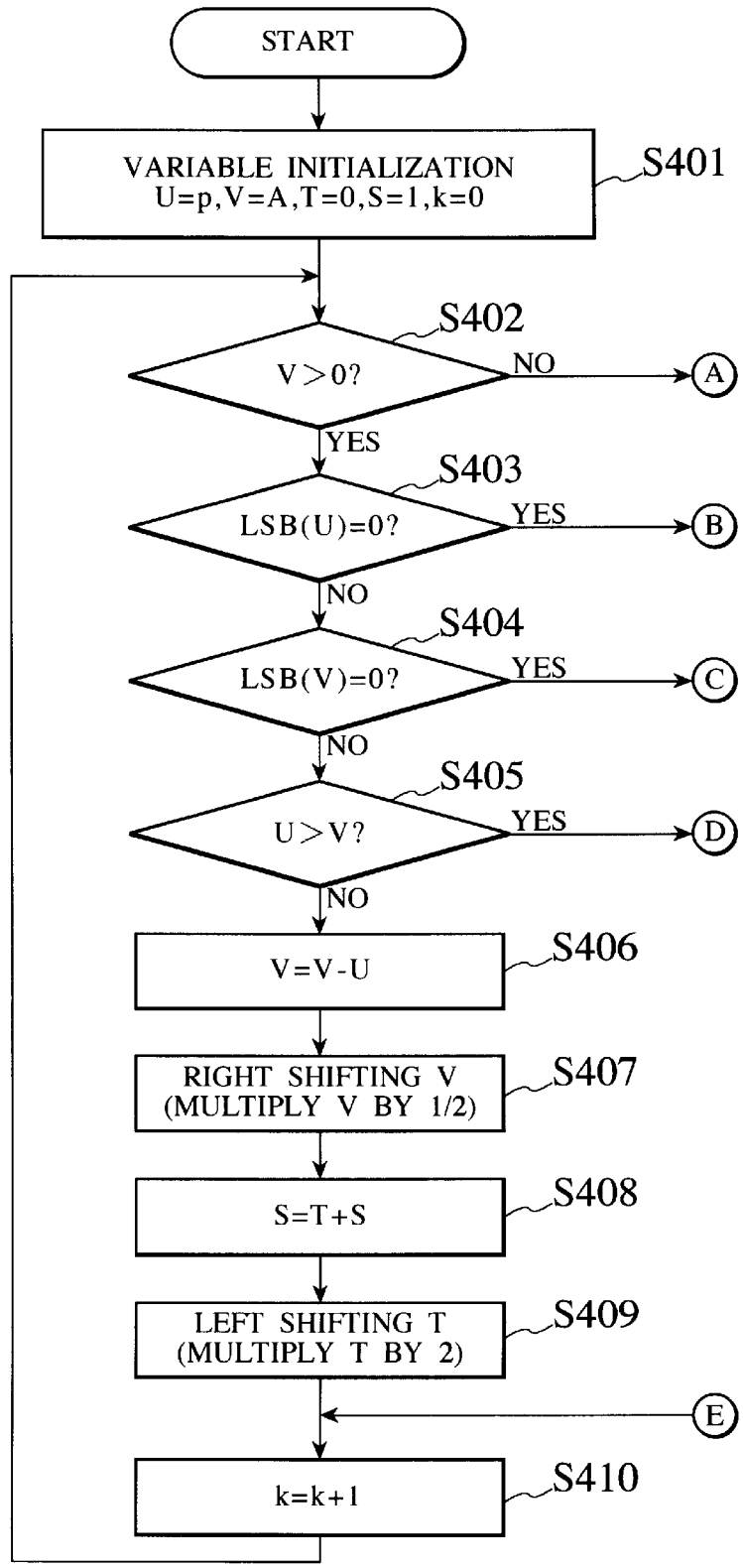
FIGS. 7A, 7B, 7C, 7D and 7E are a flow chart for one exemplary processing procedure for an inverse calculation unit in the Montgomery inverse calculation device of FIG. 6.
Figure 7B:
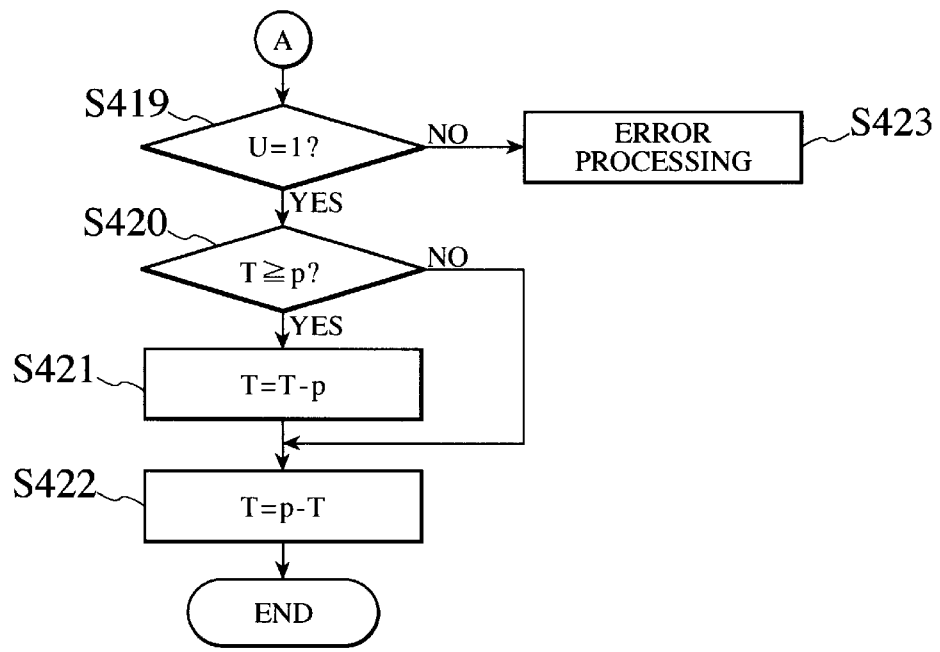
Figure 7C:
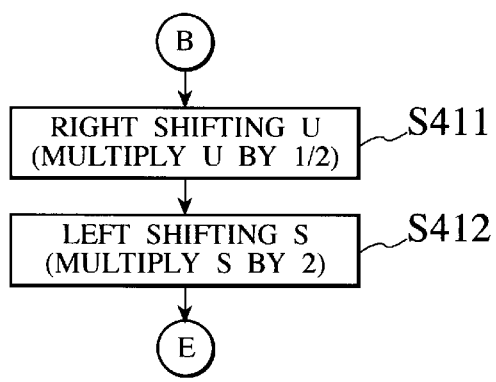
Figure 7D:
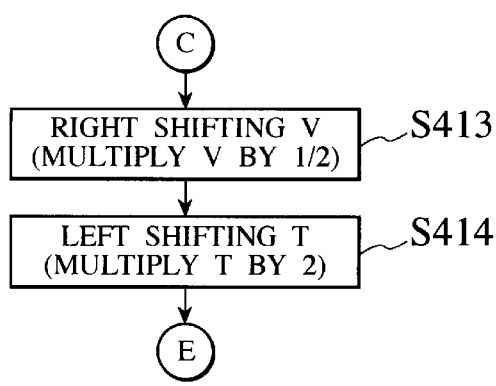
Figure 7E:
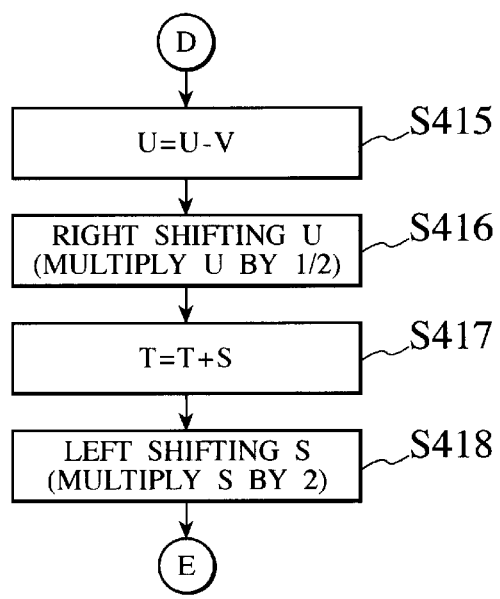

FIG. 6 shows a basic configuration of the Montgomery inverse calculation device according to the present invention, which can be used as the Montgomery inverse calculation unit 201 in the Montgomery division device 200 of FIG. 3 described above.

This Montgomery inverse calculation device 201 comprises an inverse calculation unit 301 and an inverse correction unit 302, which are to be used sequentially in computing Montgomery inverse.

In this embodiment, Montgomery inverse $X = A^{-1} \cdot R^2$ mod $p = A^{-1} \cdot 2^{2n}$ mod p is rewritten as:

$$X = A^{-1} \cdot (2^k \cdot 2^{2n-k}) \bmod p$$
$$= (A^{-1} \cdot 2^k) \cdot 2^{2n-k} \bmod p$$
$$= (A^{-1} \cdot 2^k \bmod p) \cdot 2^{2n-k} \bmod p$$
$$= C \cdot 2^{2n-k} \bmod p$$

and according to this rewritten expression, using an integer A and a modulus p (where A and p are relatively prime) as inputs, $C = A^{-1} \cdot 2^k$ mod p and k are obtained by the inverse calculation unit 301 first. Here k is an integer greater than or equal to L and less than or equal to 2L, which can be uniquely determined from A and p. Next, using these C and k and the modulus p as inputs, Montgomery inverse $X = C \cdot 2^{2n-k}$ mod p i.e. $X = A^{-1} \cdot R^2$ mod p is obtained by the inverse correction unit 302.

FIGS. 7A, 7B, 7C, 7D and 7E show one exemplary processing procedure for the inverse calculation unit 301. This procedure utilizes four multiple-precision registers referred to as registers U, V, T and S, and is constructed from left and right shifting operations on registers and additions and subtractions among registers. A number of loop iterations is to be registered into a variable k as a loop counter. Here, k is a value greater than or equal to L and less than or equal to 2L where L is a bit size of the modulus p, and a processing amount for additions and subtractions is O(L), so that an overall processing amount is at most $O(L^2)$. This processing procedure proceeds as follows.

First, a given modulus p is set in the register U, and a positive integer A which is less than or equal to p is set in the register V. Also, 0 is set in the register T, 1 is set in the register S, and 0 is set in the register k (step S401). This step S401 is the variable initialization processing.

Then, the processing from the step S402 to the step S410 is iterated while the register V has a positive value (that is, until the register V value becomes 0).

Namely, when the register V value is not 0 (step S402 YES), the iterated processing should be continued so that the processing proceeds to the step S403.

Then, whether the least significant bit (LSB) of the register U is 0 or not is judged (step S403). If it is 0, the register U value is right shifted by one bit (step S411) and the register S value is left shifted by one bit (step S412), and the processing proceeds to the step S410. At the step S410, a value of k is incremented by one and the processing returns to the step S402.

When LSB of the register U is not 0 at the step S403, whether LSB of the register V is 0 or not is judged (step S404). If it is 0, the register V value is right shifted by one bit (step S413) and the register T value is left shifted by one bit (step S414), and the processing proceeds to the step S410. At the step S410, a value of k is incremented by one and the processing returns to the step S402.

When LSB of the register U is not 0 at the step S403 and LSB of the register V is not 0 at the step S404, values of the register U and the register V are compared (step S405).

If U>V, the register V value is subtracted from the register U value (step S415) and the register U value is right shifted by one bit (step S416). Also, the register S value is added to the register T value (step S417) and the register S value is left shifted by one bit (step S418). Then, at the step S410, a value of k is incremented by one and the processing returns to the step S402.

If U<V or U=V at the step S405, the register U value is subtracted from the register V value (step S406) and the register V value is right shifted by one bit (step S407). Also, the register S value is added to the register T value (step S408) and the register T value is left shifted by one bit (step S409). Then, at the step S410, a value of k is incremented by one and the processing returns to the step S402.

This loop processing is iterated, and the processing proceeds to the step S419 when the register V value becomes 0 at the step S402. Then, whether the register U value is 1 or not is checked (step S419). The register U value is the largest common divisor of the input A and the modulus p so that if the register U value is not 1, A and p is relatively prime and an inverse of A does not exist. For this reason, in such a case, an error processing is carried out at the step S423 and the processing is terminated.

When there is no error, that is, when the register U value is 1 at the step S419, values of the register T and the modulus p are compared (step S420). If T≧p, p is subtracted from the register T value (step S421) so as to make the register T value an integer less than or equal to p. Then, a value obtained by subtracting the register T value from p is registered into the register T (step S422) and the processing is terminated.

By the above processing, the register T registers a value indicating a calculation result for $A^{-1} \cdot 2^k$ mod p.

In the Montgomery inverse calculation device 201 of FIG. 6, this $T = A^{-1} \cdot 2^k$ mod p and a value of k are given to the inverse correction unit 302 next so as to calculate Montgomery inverse.

Figure 8:
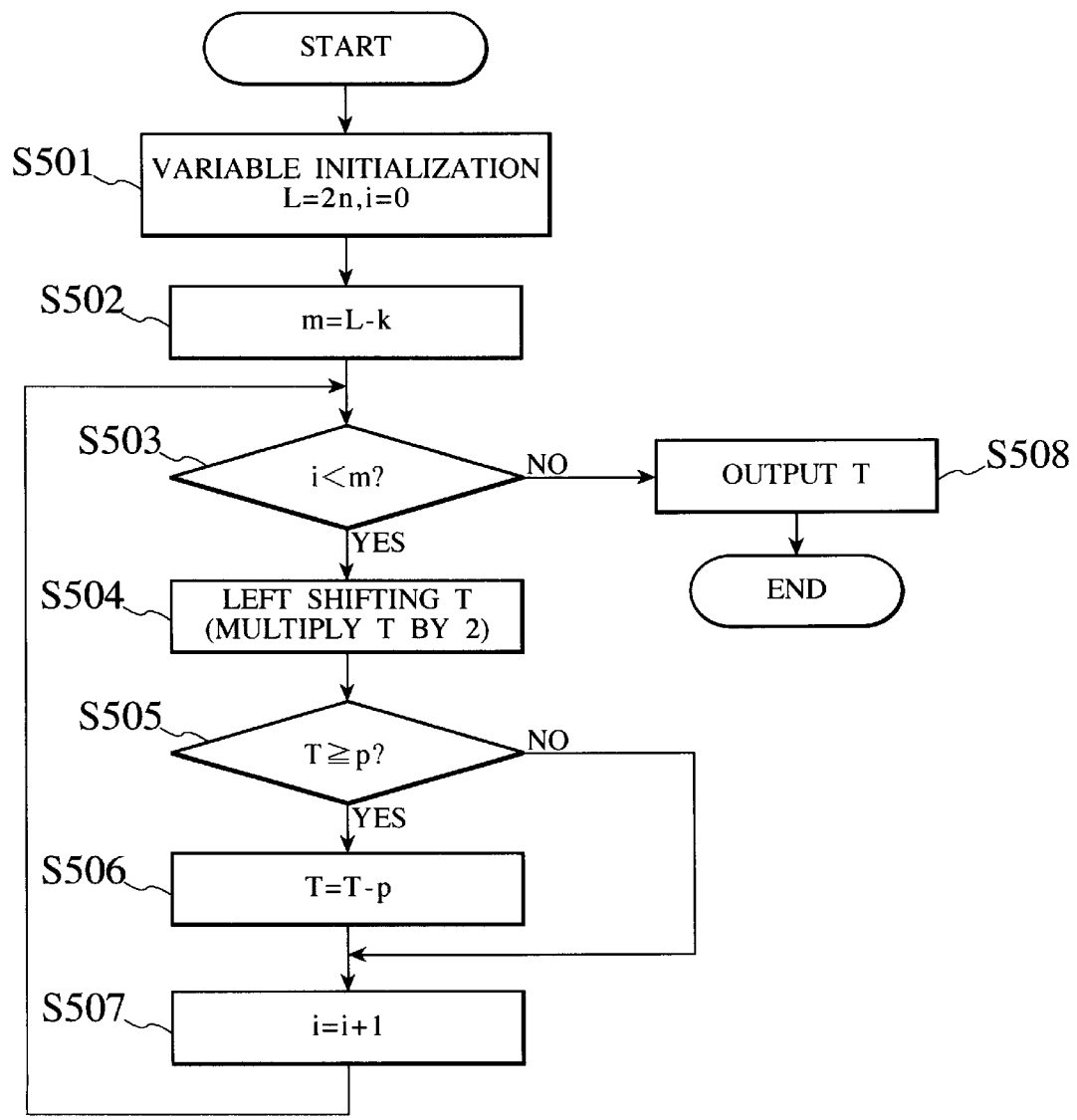
FIG. 8 is a flow chart for one exemplary processing procedure for an inverse correction unit in the Montgomery inverse calculation device of FIG. 6.
Figure 10A:
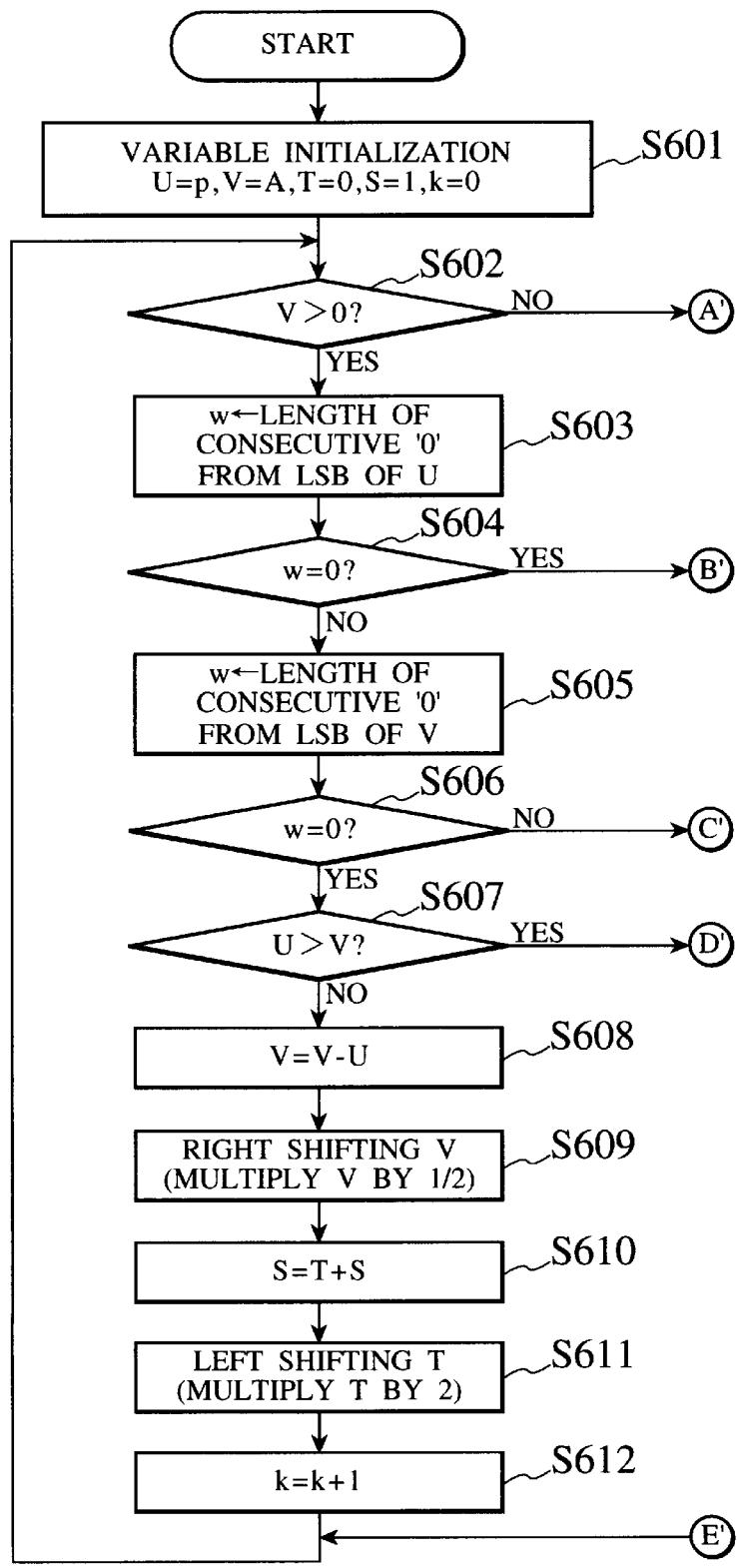
FIGS. 10A, 10B, 10C, 10D and 10E are a flow chart for another exemplary processing procedure for an inverse calculation unit in the Montgomery inverse calculation device of FIG. 6.
Figure 10B:
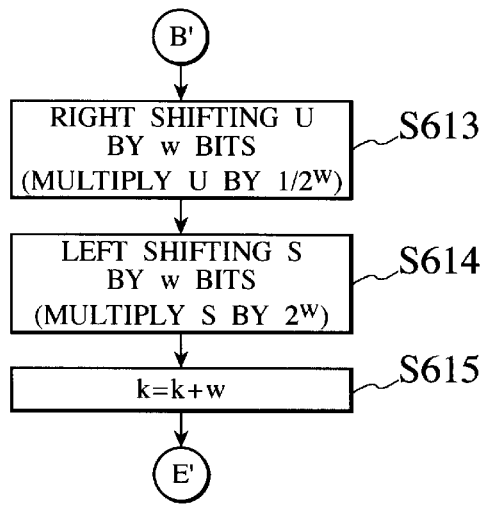
Figure 10C:
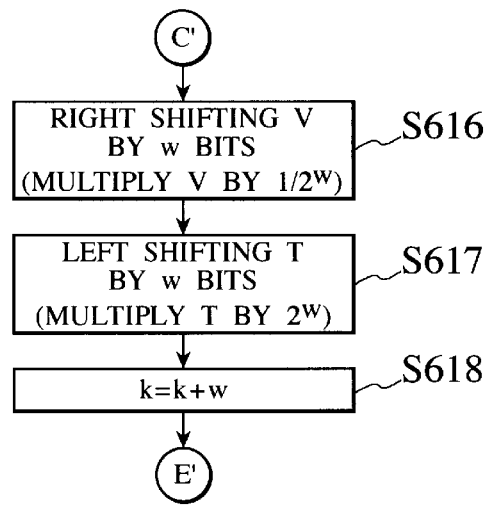
Figure 10D:
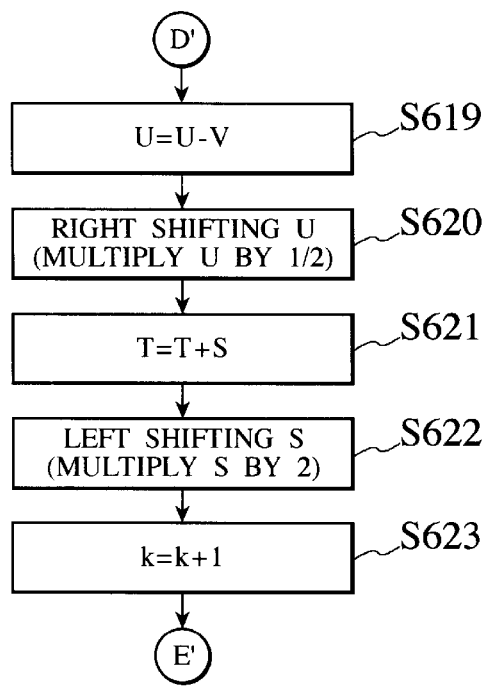
Figure 10E:
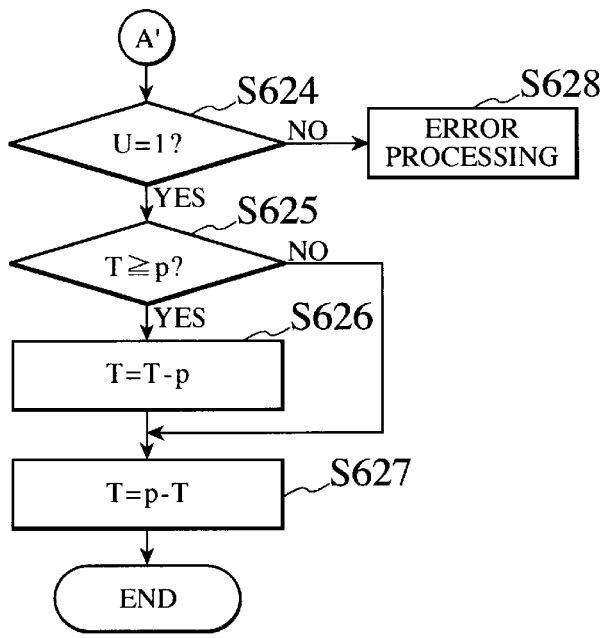

FIG. 8 shows one exemplary processing procedure for the inverse correction unit 302, which proceeds as follows.

First, L is set to be 2n where $R = 2^n$, and a loop counter i is initialized to 0 (step S501).

Then, a value of L−k is obtained as a number of loop iterations and set in a variable m (step S502).

Then, the processing from the step S503 to the step S507 is iterated until the loop counter value becomes m.

Namely, i and m are compared (step S503). If i<m, the register T value is left shifted by one bit (step S504), and T and p are compared (step S505). If T≧p, p is subtracted from the register T value (step S506). Then, a value of i is incremented by one (step S507) and the processing returns to the step S503.

If i=m at the step S503, the processing gets out of the loop. A value of the register T at this point of coming out of the loop is the Montgomery inverse value, so that this Montgomery inverse value T is outputted at the step S508 and the processing is terminated.

Note that the procedures of FIGS. 7A to 7E and FIG. 8 described above are realized by additions, subtractions and bit shifting of the registers alone, so that the Montgomery inverse calculation device 201 of FIG. 6 can be implemented efficiently.

Now, a concrete example illustrating the operation of this Montgomery inverse calculation device 201 will be described. Here, a concerte example of obtaining the Montgomery inverse of an element A=19 will be described for a case of p=23 and R=$2^5$ (n=5).

FIG. 9A and FIG. 9B show a transition of values of the registers U, V, T and S in binary notation and a value of the loop counter k in decimal notation during the iterated loop processing in the inverse calculation unit 301. Note that upper bits with values 0 for the registers T and S are not shown in FIG. 9A and FIG. 9B. Also, FIG. 9C shows a transition of the register T value in binary notation during the iterated loop processing in the inverse correction unit 302. Note that upper bits with values 0 are not shown in FIG. 9C.

First, in the inverse calculation unit 301, as a result of the initialization processing, U=p=10111, V=A=10011, T=0, S=1 and k=0 are set.

In the first loop, step S405 becomes YES because U>V so that the steps S415 to S418 and S410 are carried out. As a result, U=00010, V=10011, T=1, S=10 and k=1 are obtained.

In the second loop, the step S403 becomes YES because LSB(U)=0 so that the steps S411, S412 and S410 are carried out. As a result, U=00001, V=10011, T=10, S=100 and k=2 are obtained.

In the third loop, step S405 becomes NO because U<V so that the steps S406 to S409 and S410 are carried out. As a result, U=00001, V=01001, T=10, S=101 and k=3 are obtained.

By iterating the loop processing in this manner, after the seventh loop, U=00001, V=00000, T=100000, S=10111 and k=7 are obtained, and the processing gets out of the loop because V=00000.

Then, the step S419 becomes YES because U=1, and the step S420 becomes YES because T>p, so that the step S421 obtains T=T−p=100000−10111=1001 and the step S422 obtains T=p−T=10111−1001=1110.

Consequently, the output of the inverse calculation unit 301 is T=1110 (=14 in decimal notation) and k=7.

Next, in the inverse correction unit 302, T=1110, i=0 and m=3 are set as an initial state (note that values of i and m are in decimal notation).

In the first loop, the register T is left shifted to become T=11100 and the step S505 becomes YES so that the step S506 obtains T=101 and the step S507 makes i=1.

In the second loop, the register T is left shifted to become T=1010 and the step S505 becomes NO so that the step S506 is not carried out and the step S507 makes i=2.

In the third loop, the register T is left shifted to become T=10100 and the step S505 becomes NO so that the step S506 is not carried out and the step S507 makes i=3=m and the processing gets out of the loop.

As a result, the output T=10100=20 in decimal notation is obtained.

In this manner, the Montgomery inverse X=20 of the element A=19 for a case of p=23 and R=$2^5$ (n=5) can be obtained by the Montgomery inverse calculation device 201 of FIG. 6. Note that elements 19 and 20 in the Montgomery space correspond to elements 20 and 15 in Zp, respectively. Thus an inverse of an element 20 in Zp is calculated as 15 in this case.

Now, some other exemplary processing procedures for the inverse calculation unit 301 and the inverse correction unit 302 will be described in detail.

FIGS. 10A, 10B, 10C, 10D and 10E show another exemplary processing procedure for the inverse calculation unit 301. This procedure is similar in principle to the processing procedure of FIGS. 7A to 7E described above, but improved in that, unlike the steps S403 and S404 of the procedure of FIGS. 7A to 7E where only LSBs of the multiple-precision registers U and V are used in making judgements and register shifting by only one bit is carried out at the subsequent steps S411 and S412 or steps S413 and S414 when LSB is 0, this procedure of FIGS. 10A to 10E enables the register shifting by a plurality of bits collectively when a plurality of 0s appear consecutively from LSB. This collective processing of a plurality of bits is often advantageous, and particularly effective in realizing a fast software implementation. This procedure proceeds as follows.

First, a given modulus p is set in the register U, and a positive integer A which is less than or equal to p is set in the register V. Also, 0 is set in the register T, 1 is set in the register S, and 0 is set in the register k (step S601). This step S601 is the variable initialization processing.

Then, the processing from the step S602 to the step S612 is iterated while the register V has a positive value (that is, until the register V value becomes 0).

Namely, when the register V value is not 0 (step S602 YES), a length of consecutive "0" from LSB of the register U is counted and set in a variable w (step S603), and whether w is 0 or not is judged (step S604). If it is not 0, the register U value is right shifted by w bits (step S613) and the register S value is left shifted by w bits (step S614). Then, w is added to the loop counter k (step S615) and the processing returns to the step S602.

When w is 0 at the step S604, a length of consecutive "0" from LSB of the register V is counted and set in a variable w (step S605), and whether w is 0 or not is judged (step S606). If it is not 0, the register V value is right shifted by w bits (step S616) and the register T value is left shifted by w bits (step S617). Then, w is added to the loop counter k (step S618) and the processing returns to the step S602.

When w is 0 at the step S606, values of the register U and the register V are compared (step S607). If U>V, the register V value is subtracted from the register U value (step S619) and the register U value is right shifted by one bit (step S620). Also, the register S value is added to the register T value (step S621) and the register S value is left shifted by one bit (step S622). Then, 1 is added to the loop counter k (step S623) and the processing returns to the step S602.

If U<V or U=V at the step S607, the register U value is subtracted from the register V value (step S608) and the register V value is right shifted by one bit (step S609). Also, the register S value is added to the register T value (step S610) and the register T value is left shifted by one bit (step S611). Then, 1 is added to the loop counter k (step S612) and the processing returns to the step S602.

This loop processing is iterated, and the processing proceeds to the step S624 when the register V value becomes 0 at the step S602. Then, whether the register U value is 1 or not is checked (step S624). The register U value is the largest common divisor of the input A and the modulus p so that if the register U value is not 1, A and p is relatively prime and an inverse of A does not exist. For this reason, in such a case, an error processing is carried out at the step S628 and the processing is terminated.

When there is no error, that is, when the register U value is 1 at the step S624, values of the register T and the modulus p are compared (step S625). If T≧p, p is subtracted from the register T value (step S626) so as to make the register T value an integer less than or equal to p. Then, a value obtained by subtracting the register T value from p is registered into the register T (step S627) and the processing is terminated.

By the above processing, the register T registers a value indicating a calculation result for $A^{-1} \cdot 2^k$ mod p.

Figure 11A:
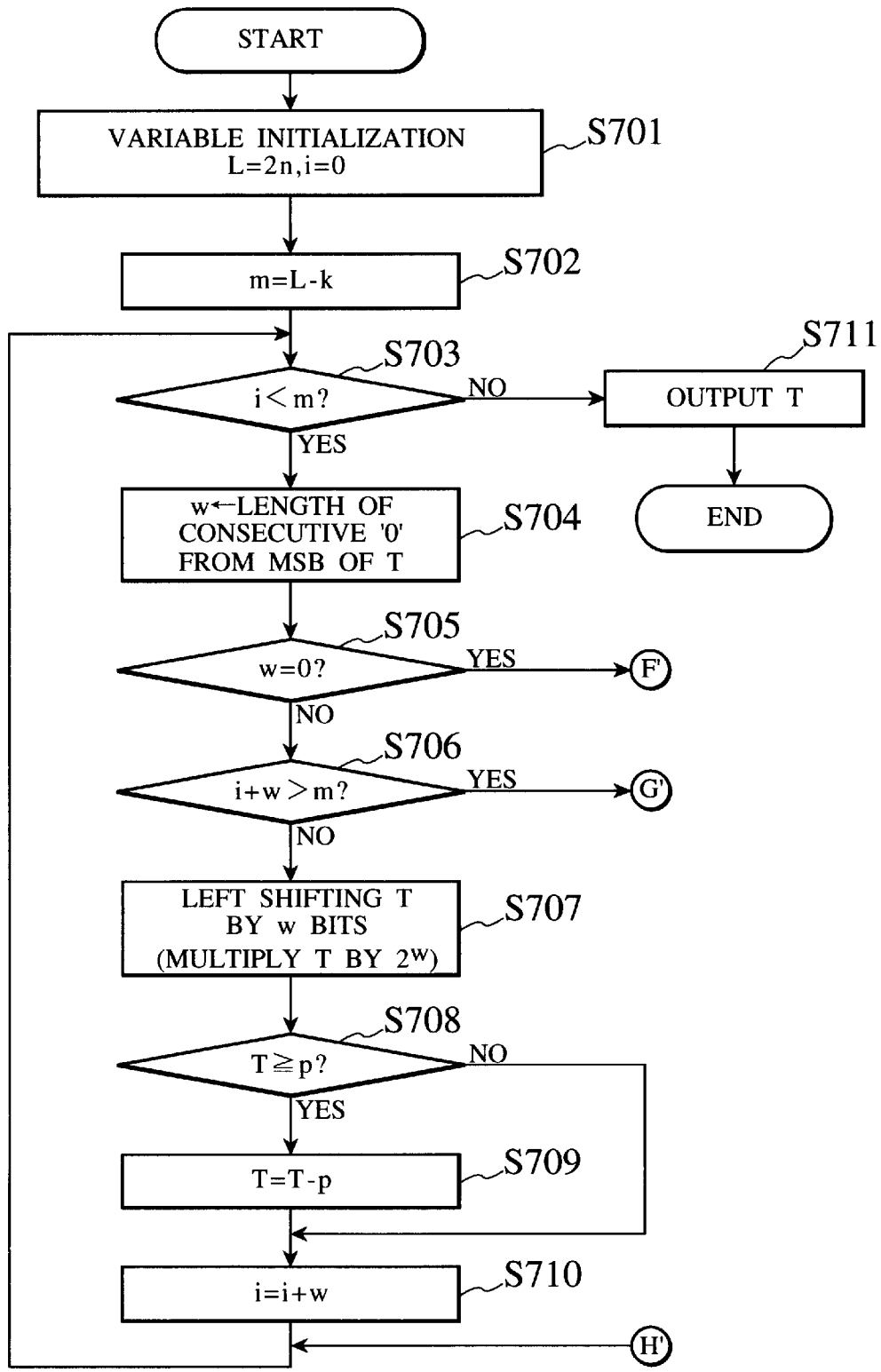
Figure 12A:
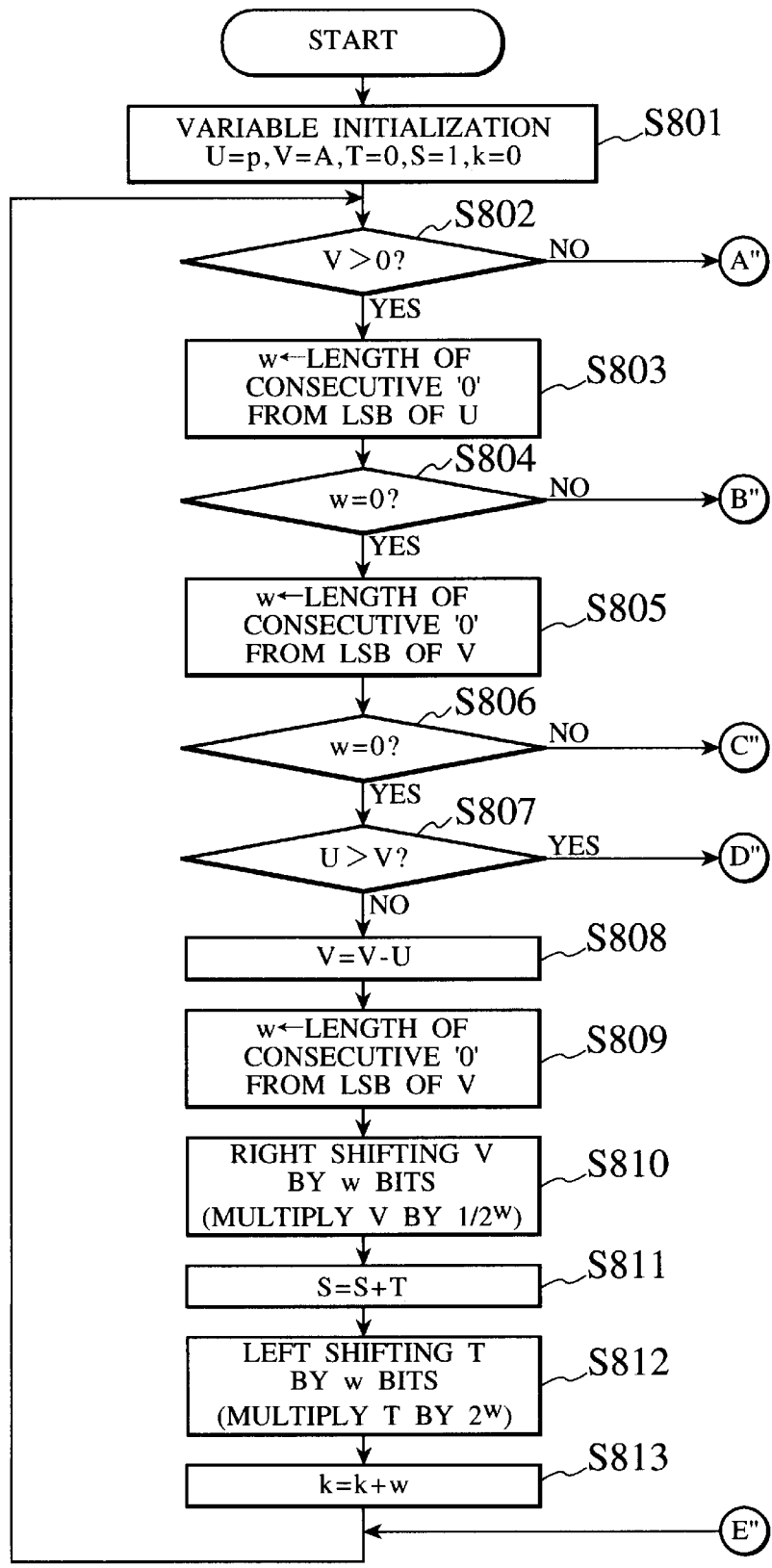
FIGS. 12A, 12B, 12C, 12D and 12E are a flow chart for another exemplary processing procedure for an inverse calculation unit in the Montgomery inverse calculation device of FIG. 6.
Figure 12B:
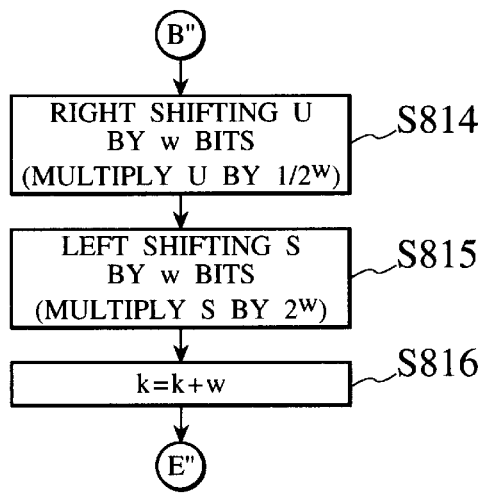
Figure 12C:
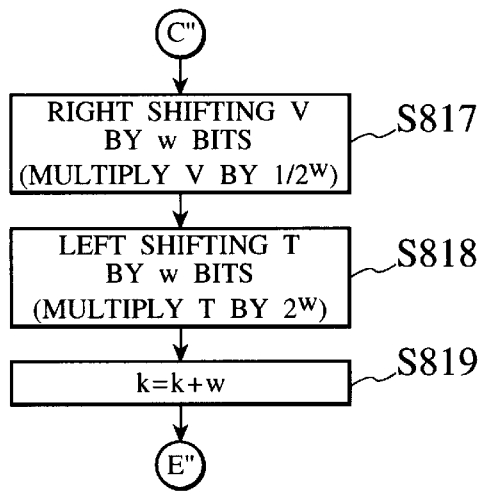
Figure 12D:
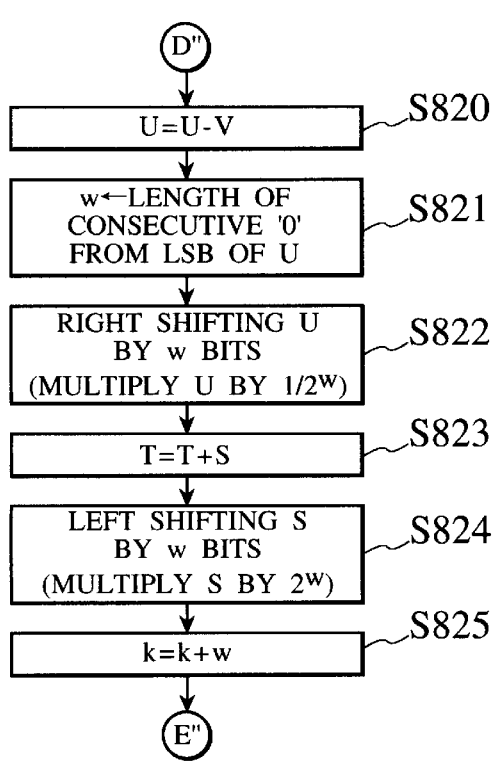
Figure 12E:
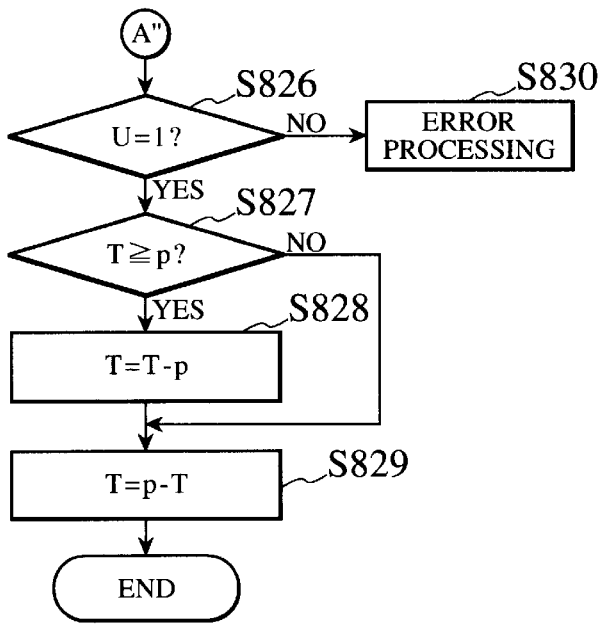

FIGS. 11A, 11B and 11C show another exemplary processing procedure for the inverse correction unit 302. This procedure is also similar in principle to the processing procedure of FIG. 8 described above, but improved in that, unlike the steps S504 of the procedure of FIG. 8 where the left shifting of the multiple-precision register T by only one bit is iterated, this procedure of FIGS. 11A to 11C enables the register shifting by a plurality of bits collectively. This collective processing of a plurality of bits is often advantageous, and particularly effective in realizing a fast software implementation. This procedure proceeds as follows.

First, L is set to be 2n where $R=2^n$, and a loop counter i is initialized to 0 (step S701).

Then, a value of L−k is obtained as a number of loop iterations and set in a variable m (step S702).

Then, the processing from the step S703 to the step S710 is iterated until the loop counter i becomes m.

Namely, i and m are compared (step S703). If i<m, a length of consecutive "0" from the most significant bit (MSB) of the register T when the register T is viewed as a binary expression in the same size as the modulus p is counted and set in a variable w (step S704).

Then, whether w is 0 or not is judged (step S705). If it is 0, the register T value is left shifted by one bit (step S712), and a value of p is subtracted from the register value T (step S713) because a value of T resulting from the step S712 is greater than p. Then, 1 is added to the loop counter i (step S714) and the processing returns to the step S703.

When w is not 0 at the step S705, i+w is calculated and this value is compared with a value of m (step S706). If i+w>m, a value m−i is set in w (step S715) and the register T value is left shifted by w bits (step S716). Then, the loop counter i set to be m (step S717) and the processing returns to the step S703. Note that the result of the left shifting at the step S716 is always smaller than p so that no correction is necessary here.

When i+w≦m or i+w=m at the step S706, the register T value is left shifted by w bits (step S707), and T and p are compared (step S708) because there is a possibility for a value of T resulting from the step S707 to be greater than p. If T≧p, p is subtracted from the register T value (step S709). Then, w is added to the loop counter i (step S710) and the processing returns to the step S703.

This loop processing is iterated, and the processing gets out of the loop processing when a value of the loop counter i becomes m at the step S703. A value of the register T at this point of coming out of the loop is the Montgomery inverse value, so that this Montgomery inverse value T is outputted at the step S711 and the processing is terminated.

FIGS. 12A, 12B, 12C, 12D and 12E show another exemplary processing procedure for the inverse calculation unit 301. This procedure is similar in principle to the processing procedure of FIGS. 7A to 7E or FIGS. 10A to 10E described above, but improved in that, unlike the steps S609, S611, S620 and S622 of the procedure of FIGS. 10A to 10E where the register shifting by only one bit is carried out, this procedure of FIGS. 12A to 12E enables the register shifting by a plurality of bits collectively. This procedure proceeds as follows.

First, a given modulus p is set in the register U, and a positive integer A which is less than or equal to p is set in the register V. Also, 0 is set in the register T, 1 is set in the register S, and 0 is set in the register k (step S801). This step S801 is the variable initialization processing.

Then, the processing from the step S802 to the step S813 is iterated while the register V has a positive value (that is, until the register V value becomes 0).

Namely, when the register V value is not 0 (step S802 YES), a length of consecutive "0" from LSB of the register U is counted and set in a variable w (step S803), and whether w is 0 or not is judged (step S804). If it is not 0, the register U value is right shifted by w bits (step S814) and the register S value is left shifted by w bits (step S815). Then, w is added to the loop counter k (step S816) and the processing returns to the step S802.

When w is 0 at the step S804, a length of consecutive "0" from LSB of the register V is counted and set in a variable w (step S805), and whether w is 0 or not is judged (step S806). If it is not 0, the register V value is right shifted by w bits (step S817) and the register T value is left shifted by w bits (step S818). Then, w is added to the loop counter k (step S819) and the processing returns to the step S802.

When w is 0 at the step S806, values of the register U and the register V are compared (step S807). If U>V, the register V value is subtracted from the register U value (step S820). Then, a length of consecutive "0" from LSB of the register U is counted and set in a variable w (step S821) and the register U value is right shifted by w bits (step S822). Also, the register S value is added to the register T value (step S823) and the register S value is left shifted by w bits (step S824). Then, w is added to the loop counter k (step S825) and the processing returns to the step S802.

If U<V or U=V at the step S807, the register U value is subtracted from the register V value (step S808). Then, a length of consecutive "0" from LSB of the register V is counted and set in a variable w (step S809) and the register V value is right shifted by w bits (step S810). Also, the register S value is added to the register T value (step S811) and the register T value is left shifted by w bits (step S812). Then, w is added to the loop counter k (step S813) and the processing returns to the step S802.

This loop processing is iterated, and the processing proceeds to the step S826 when the register V value becomes 0 at the step S802. Then, whether the register U value is 1 or not is checked (step S826). The register U value is the largest common divisor of the input A and the modulus p so that if the register U value is not 1, A and p is relatively prime and an inverse of A does not exist. For this reason, in such a case, an error processing is carried out at the step S830 and the processing is terminated.

When there is no error, that is, when the register U value is 1 at the step S826, values of the register T and the modulus p are compared (step S827). If T≧p, p is subtracted from the register T value (step S828) so as to make the register T value an integer less than or equal to p. Then, a value obtained by subtracting the register T value from p is registered into the register T (step S829) and the processing is terminated.

By the above processing, the register T registers a value indicating a calculation result for $A^{-1} \cdot 2^k$ mod p.

Note that the procedures of FIGS. 10A to 10E, FIGS. 11A to 11C, and FIGS. 12A to 12E described above are also realized by additions, subtractions and bit shifting of the registers alone.

Note also that, the Montgomery inverse calculation unit 201 of the Montgomery division device 200 of FIG. 3 or the Montgomery inverse calculation device 201 of FIG. 6 can be realized by any desired combination of the inverse calculation unit 301 operated according to any of the procedures of FIGS. 7A to 7E, FIGS. 10A to 10E, and FIGS. 12A to 12E, and the inverse correction unit 302 operated according to any of the procedures of FIG. 8 and FIGS. 11A to 11C.

It is also possible to realize the Montgomery division device according to the present invention in a modified configuration.

Figure 13:
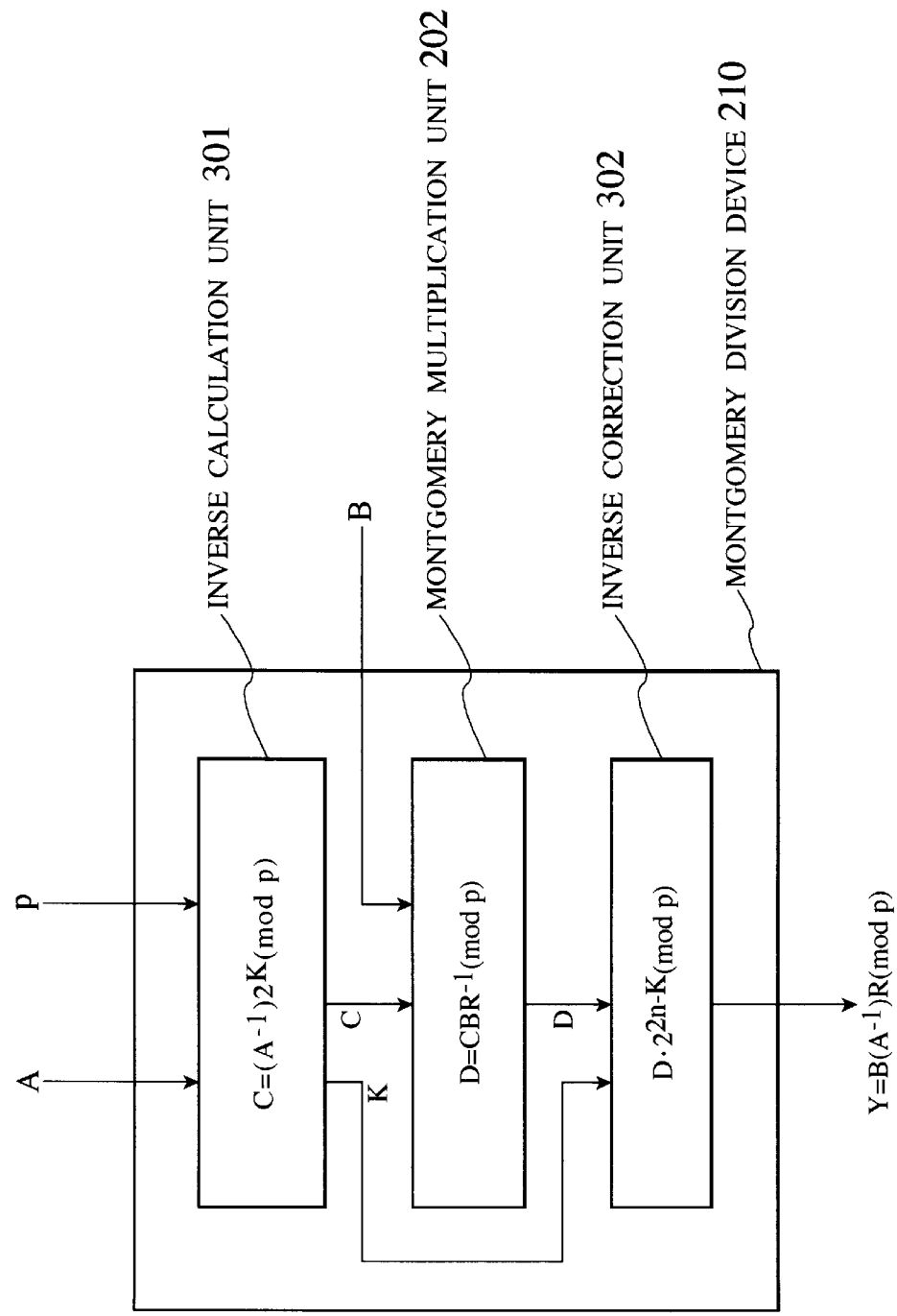
FIG. 13 is a block diagram showing a modified configuration of a Montgomery division device according to the present invention.

FIG. 13 shows this modified configuration of the Montgomery division device according to the present invention. This Montgomery division device 210 comprises an inverse calculation unit 301, a Montgomery multiplication unit 202, and an inverse correction unit 302. Note that the Montgomery inverse calculation device 201 can be divided into two parts of the inverse calculation unit 301 and the inverse correction unit 302, for example, as shown in FIG. 6, and in this modified configuration of FIG. 13, the inverse calculation unit 301 is provided at the previous stage of the Montgomery multiplication unit 202 and the inverse correction unit 302 is provided at the next state of the Montgomery multiplication unit 202.

This modified configuration is possible because the operation of the inverse correction unit 302 and the operation of the Montgomery multiplication unit 202 with respect to the output C of the inverse calculation unit 301 are both multiplications so that they are commutative. In other words, this modified configuration of FIG. 13 computes Montgomery division according to the following rewritten expression.

$$\begin{aligned} Y &= B \cdot A^{-1} \cdot R \bmod p \\ &= B \cdot (A^{-1} \cdot 2^K) 2^{-K} \cdot (R^{-1} R^2) \bmod p \\ &= B \cdot (A^{-1} \cdot 2^K \bmod p) \cdot R^{-1} (R^2 \cdot 2^{-K}) \bmod p \\ &= (B \cdot C \cdot R^{-1} \bmod p) \cdot 2^{2n-K} \bmod p \\ &= D \cdot 2^{2n-K} \bmod p \end{aligned}$$

Thus it is possible to construct the Montgomery division device without utilizing the Montgomery inverse calculation unit and the Montgomery multiplication unit sequentially. What is important here is to be able to compute Montgomery division $Y=B \cdot A^{-1} \cdot R$ mod p efficiently, and to this end, it is also possible to use the constituents of the Montgomery inverse calculation device, that is the inverse calculation unit and the inverse correction unit, in separation.

As described, according to this embodiment, the iterated processing of multiple-precision arithmetic operations such as that of the elliptic curve cryptosystem can be executed at high speed by computing Montgomery inverse calculation and Montgomery division from inputs of elements in the Montgomery space. Consequently, once the elements in integers modulo p are converted into elements in the Montgomery space, the iterated processing can be continually executed in the Montgomery space, and it suffices to inversely convert elements in the Montgomery space into elements in the integers modulo p at the end, so that the overhead due to the Montgomery conversion and inverse Montgomery conversion can be reduced in overall perspective. In addition, the Montgomery inverse calculation and the Montgomery division of this embodiment can be realized by additions, subtractions and bit shifting of multiple-precision registers alone, so that they can be efficiently implemented by either hardware or software.

Figure 14:
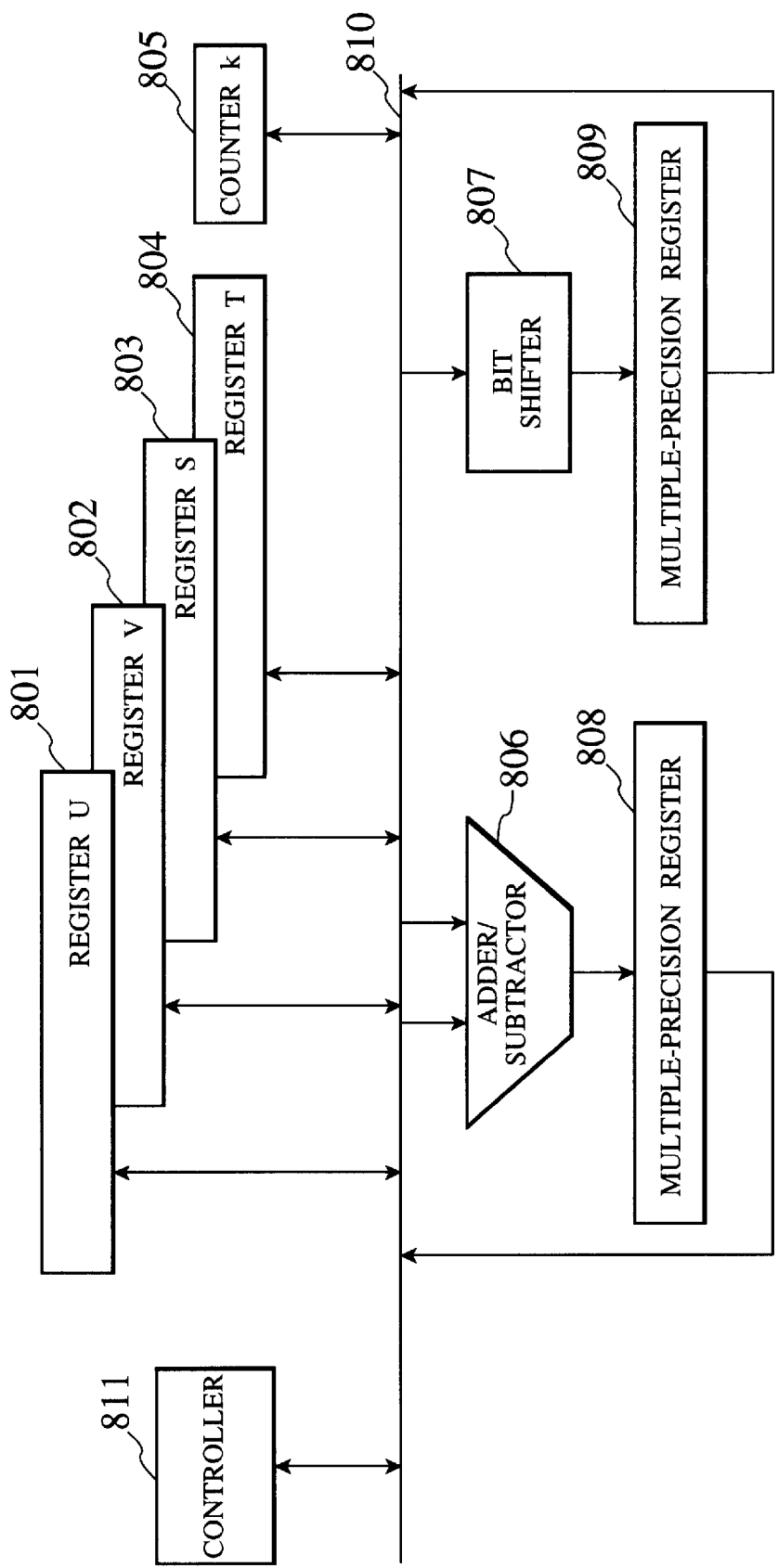
FIG. 14 is a block diagram showing an exemplary hardware configuration of a Montgomery inverse calculation device according to the present invention.

Now, FIG. 14 shows an exemplary hardware configuration for the Montgomery inverse calculation device according to the present invention.

This hardware configuration of FIG. 14 comprises a multiple-precision register U 801, a multiple-precision register V 802, a multiple-precision register S 803, a multiple-precision register T 804, a loop counter k 805 in a form of a single-precision register, an adder/subtracter 806 and a bit shifter 807 constituting a processing unit, a multiple-precision register 808 for storing an output of the adder/subtracter 806, a multiple-precision register 809 for storing an output of the bit shifter 807, and a controller 811 for controlling overall operation. These constituent elements are mutually connected through a data bus 810 so that mutual data transfer is possible. The controller 811 also has functions to carry out a "0"/"1" judgement for a specific bit of a register and a checking of a length of consecutive "0" in a specific portion of a register according to the processing procedures as described above.

The inverse calculation unit 301 of FIG. 6 can be realized by controlling this hardware configuration according to the processing procedure of FIGS. 7A to 7E, FIGS. 10A to 10B, or FIGS. 12A to 12E, and the inverse correction unit 302 of FIG. 6 can be realized by setting the modulus p in an idle register (such as the register U) and controlling this hardware configuration according to the processing procedure of FIG. 8 or FIGS. 11A to 1C.

Now, implementations of cryptographic operations using Montgomery arithmetic system including the Montgomery division device of the present invention will be described in detail.

Figure 15:
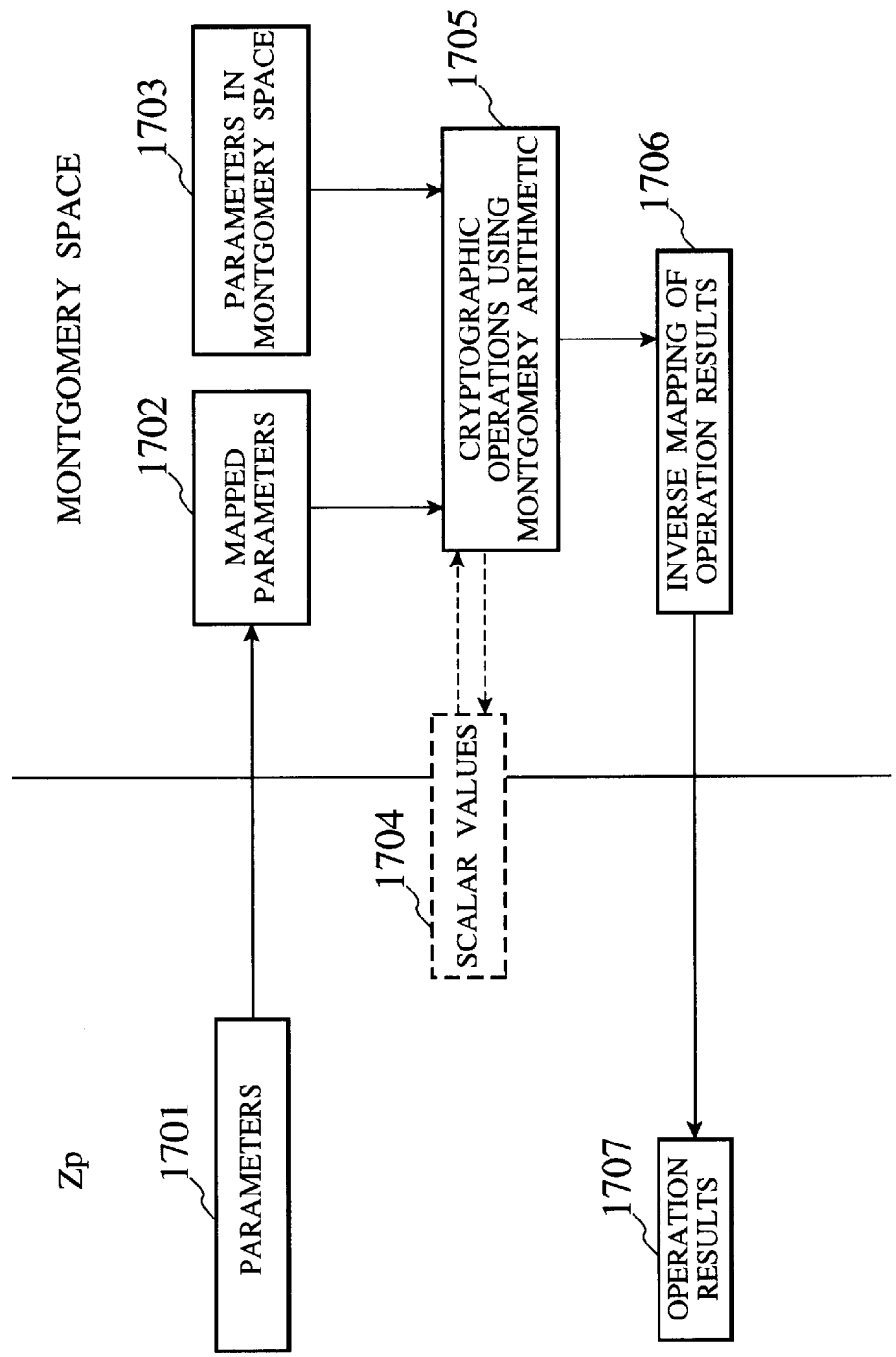
FIG. 15 is a diagram showing a principle of one implementation of elliptic curve cryptosystem operations using Montgomery arithmetic system according to the present invention.

FIG. 15 shows a principle of cryptographic operations using Montgomery arithmetic system. Here, Montgomery arithmetic system is an arithmetic system constructed from arithmetic operations (addition, subtraction, multiplication, division) and inverse calculation in the Montgomery space as indicated in FIG. 1.

The cryptographic operations often require specific operations on key data, plaintext data, ciphertext data, signature data, etc., in Zp. In a case of applying the Montgomery arithmetic, parameters 1701 defined in Zp are mapped into mapped parameters 1702 in the Montgomery space first. On the other hand, some parameters are stored as parameters 1703 in the Montgomery space. In addition, parameters other than those in Zp such as scalar values 1704 for example are utilized directly in the cryptographic operations. In general, parameters 1701 to be mapped into the Montgomery space such as correspondent's public key or signature data and ciphertext data are going to be changed session by session, depending on a correspondent. On the other hand, data to be stored as parameters 1703 in the Montgomery space include system parameters and the like which are to be used semi-fixedly.

Then, according to these parameters 1701, 1703 and 1704, specific cryptographic operations 1705 using Montgomery arithmetic operations are carried out. For example, when the cryptographic operations are exponential calculations, exponential calculations using Montgomery multiplication are carried out. Also, when the cryptographic operations are elliptic curve cryptosystem operations given by combinations of arithmetic operations in Zp as field of definition, elliptic curve cryptosystem operations given by combinations of arithmetic operations in the Montgomery space as field of definition are carried out.

Note that the elliptic curve cryptosystem operations can be given by two different representations of points called Affine coordinates and Projective coordinates. In the case of Affine coordinates, data on a point is represented by a two-dimensional data (x, y) in the field of definition, whereas in the case of Projective coordinates, data on a point is represented by a three-dimensional data (x, y, z) in the field of definition. Moreover, the case of Affine coordinates utilizes addition subtraction, multiplication and division in the field of definition, whereas the case of Projective coordinates utilizes addition, subtraction and multiplication and forms two-dimensional data by calculating (x/z, y/z) at a time of finally obtaining data at a uniquely specified point. When Montgomery arithmetic is applied, the elliptic curve cryptosystem operations are carried out by utilizing addition, subtraction, multiplication and division in the Montgomery space in the case of Affine coordinates, or by utilizing addition, subtraction and multiplication in the Montgomery space in the case of Projective coordinates.

Note also that, depending on cryptosystems, there are cases where elements other than those in the Montgomery space are required during the cryptographic operations. In such a case, it is necessary to carry out a processing in which elements in the Montgomery space are inversely converted into Zp once and values in appropriate system are obtained from values in Zp. This processing is indicated in FIG. 15 by a dashed line from 1705 to 1704.

Finally, operation results 1706 obtained by the cryptographic operations in the Montgomery space are inversely mapped into operation results 1707 in Zp, so as to obtain desired cryptographic operation results. In a case of mapping an element a in Zp into an element A in the Montgomery space, A=aR mod p is calculated. Conversely, in a case of mapping an element A in the Montgomery space into an element a in Zp, a=AR$^{-1}$ mod p is calculated. Note that, depending on cryptosystems, a part of the operation results may be obtained as elements other than those of the Montgomery space, such as the scalar values 1704, for example.

Figure 16:
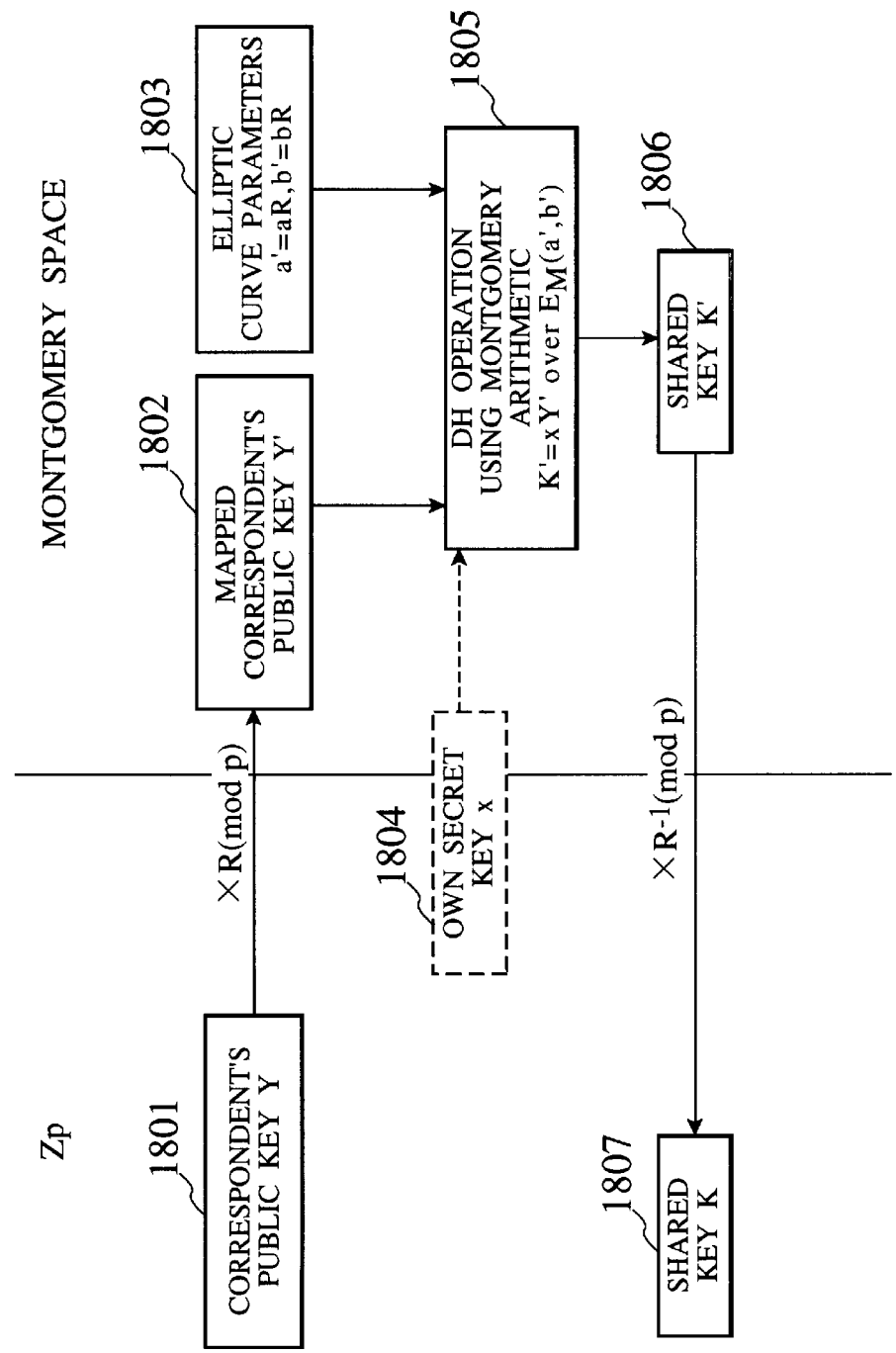
FIG. 16 is a diagram showing a concrete example of elliptic curve cryptosystem operations using Montgomery arithmetic system according to the implementation of FIG. 15.

Next, a concrete example will be described with reference to FIG. 16. This example realizes the DH (Diffie-Hellman) key sharing method over elliptic curves using Montgomery arithmetic. The elliptic DH operation is an operation for obtaining K=xY over E/Fp for a correspondent's public key Y (a point on elliptic curves E/Fp) and own secret key x (a scalar value). The operation result K is a point on elliptic curves.

First, the correspondent's public key Y is mapped into the Montgomery space (1801). Y is a point on elliptic curves E/Fp which is two-dimensional data defined by Y=(Yx, Yy) and Zp, so that this processing amounts to obtaining Y'= (Y'x, Y'y) by calculating Y'x=YxR mod p and Y'y=YyR mod p (1802). Elliptic curve parameters a and b are parameters to be used commonly in this system, which are converted into the Montgomery space only once initially and converted values are stored thereafter (1803). That is, a'=aR mod p and b'=bR mod p are calculated and stored. On the other hand, own secret key x is a scalar value, and this value is stored as it is (1804). Then, using these parameters, the elliptic DH operation is carried out in the Montgomery space (1805). That is, K'=xY' over E$_M$ (a', b')/Fp is calculated, where E$_M$ (a', b')/Fp represents elliptic curves defined in the Montgomery space. Finally, the calculated point K'=(K'x, K'y) on elliptic curves is inversely converted into a value in Zp. That is, K=(Kx, Ky) is obtained by calculating Kx=K'xR$^{-1}$ mod p and Ky=K'yR$^{-1}$ mod p.

Figure 17:
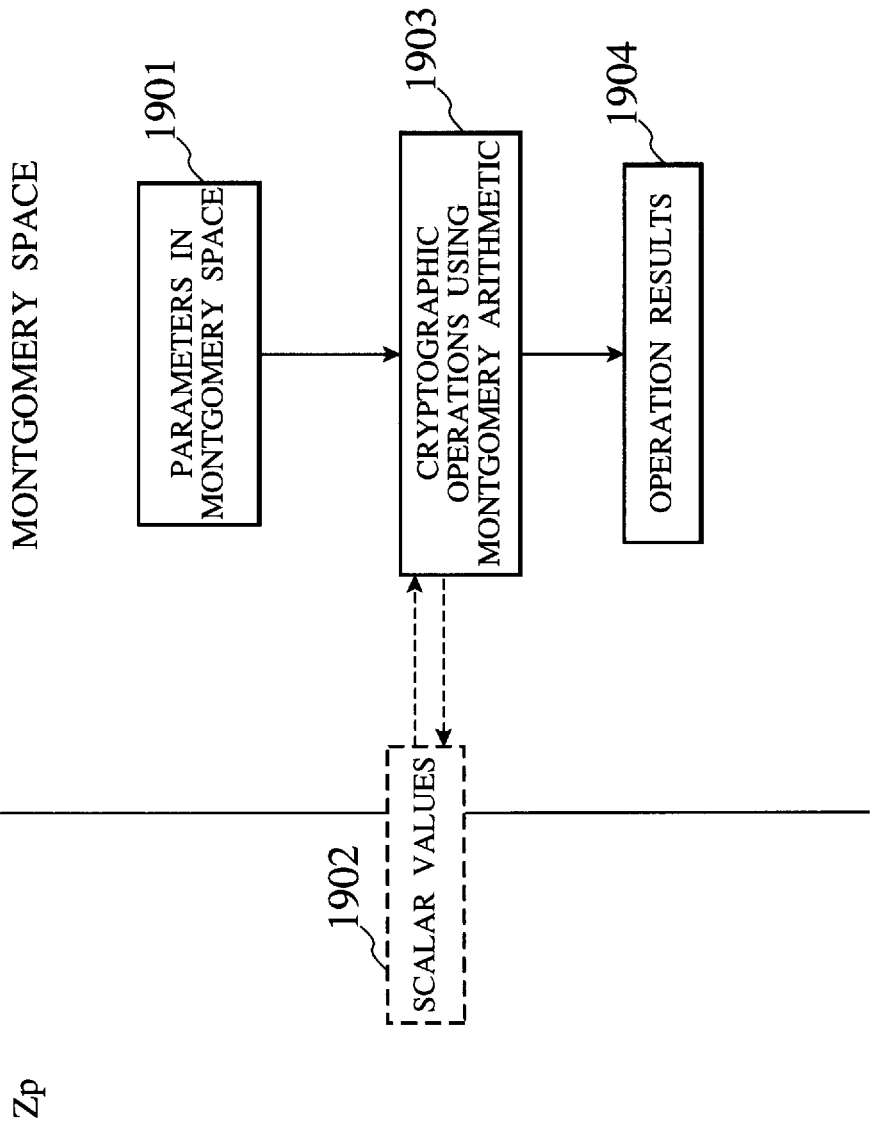
FIG. 17 is a diagram showing a principle of another implementation of elliptic curve cryptosystem operations using Montgomery arithmetic system according to the present invention.

Note that the Montgomery space is isomorphic to the original Zp so that it is also possible to define cryptosystem in the Montgomery space and utilize it for the digital signing and the key distribution. FIG. 17 shows a principle of this case.

First, in a case of defining cryptosystem in the Montgomery space, parameters ordinarily defined in Zp are defined in advance as parameters 1901 in the Montgomery space. Note that, depending on cryptosystems, a part of parameters is defined as scalar values 1902.

Then, cryptographic operations 1903 are realized by Montgomery arithmetic operations using the parameters 1901 defined in the Montgomery space, and the parameters 1902 defined as scalar values if necessary. Note that, depending on cryptosystems, there are cases where elements other than those in the Montgomery space are required during the cryptographic operations. In such a case, it is necessary to carry out a processing in which elements in the Montgomery space are inversely converted into Zp once and values in appropriate system are obtained from values in Zp. This processing is indicated in FIG. 17 by a dashed line from 1903 to 1902.

Finally, operation results 1904 obtained by this C cryptographic operations 1903 using the Montgomery arithmetic give the desired cryptographic operation results. Note that, depending on cryptosystems, a part of the operation results may be obtained as elements other than those of the Montgomery space, such as the scalar values 1902, for example.

As can be seen from a comparison of FIG. 15 and FIG. 17, the cryptosystem defined in the Montgomery space is an efficient system, because a processing (from 1701 to 1702) for mapping parameters required for the cryptographic operations from the ordinary Zp into the Montgomery space and a processing (from 1706 to 1707) to inversely mapping operation results obtained in the Montgomery space into the ordinary Zp are unnecessary.

Figure 18:
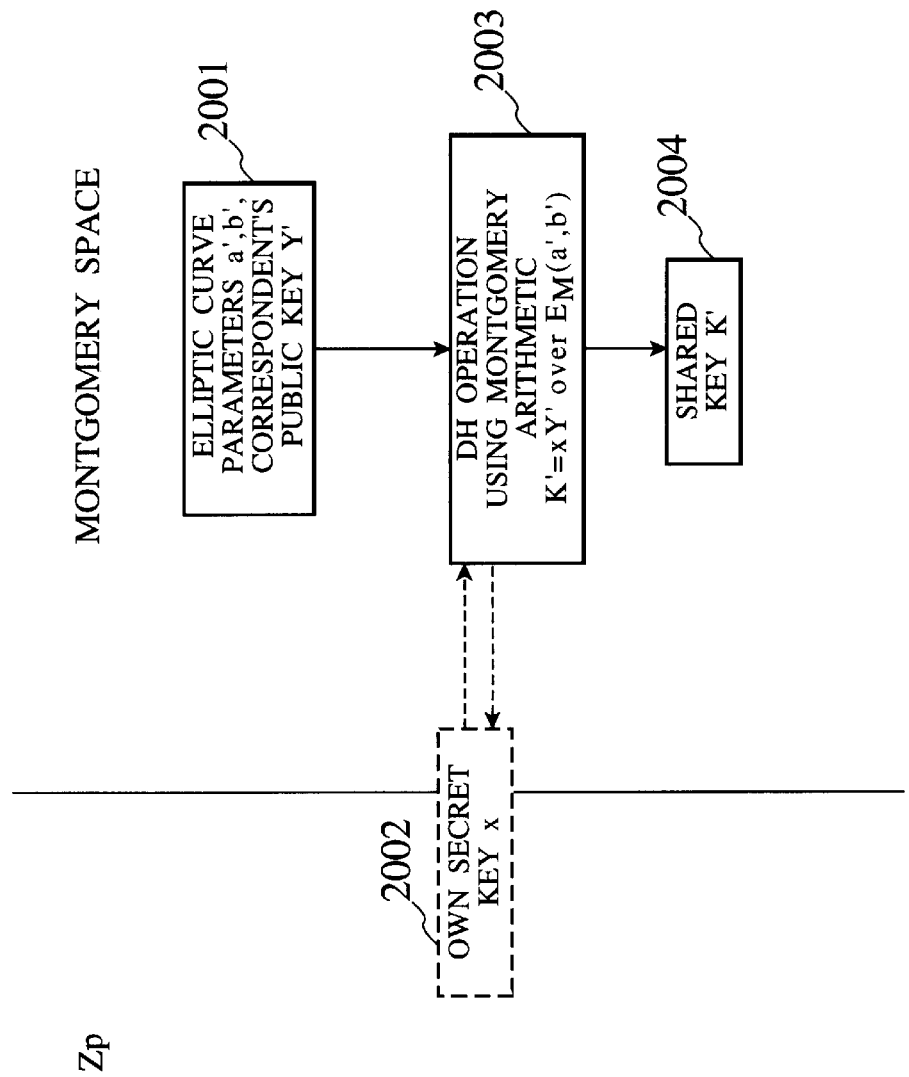
FIG. 18 is a diagram showing a concrete example of elliptic curve cryptosystem operations using Montgomery arithmetic system according to the implementation of FIG. 17.

Next, a concrete example will be described with reference to FIG. 18. This example realizes the DH (Diffie-Hellman) key sharing method over elliptic curves defined in the Montgomery space. The elliptic DH operation defined in the Montgomery space is an operation for obtaining K'=xY' over E$_M$ (a', b')/Fp for a correspondent's public key Y' (a point on elliptic curves E$_M$/Fp) and own secret key x (a scalar value). The operation result K' is a point on elliptic curves EM (a', b')/Fp.

In this case, the correspondent's public key Y' is defined in advance as a value in the Montgomery space (2001). That is, Y' is two-dimensional data (Y'x, Y'y) where Y'x and Y'y are values defined in the Montgomery space. In addition, elliptic curve parameters a' and b' to be used commonly in this system are also defined in advance as values in the Montgomery space (2001). On the other hand, own secret key x is a scalar value, and this value is stored as it is (2002). Then, using these parameters, the elliptic DH operation defined in the Montgomery space is carried out (2003). That is, K'=xY' over E$_M$ (a', b')/Fp is calculated. Finally, the calculated point K'=(K'x, K'y) on elliptic curves gives a desired shared key (2004).

As described, according to the present invention, a division result is obtained by carrying out inverse calculation and multiplication in the Montgomery space, so that Montgomery division result can be directly obtained from elements in the Montgomery space as input. As a result, the overhead due to the conversion and inverse conversion between the Montgomery space and the original integers modulo p can be reduced and therefore a fast implementation of Montgomery division can be realized.

Also, according to the present invention, Montgomery inverse calculation can be carried out within the Montgomery space, so that the overhead due to the conversion and inverse conversion between the Montgomery space and the original integers modulo p can be reduced and therefore a fast implementation of Montgomery inverse calculation can be realized.

Also, according to the present invention, Montgomery inverse calculation can be realized by addition, subtraction and bit shifting of multiple-precision registers, so that it is possible to realize a fast implementation by either hardware or software. Similarly, Montgomery division can be realized in a fast implementation.

Consequently, in cryptosystems using basic operations in a form of iterated processing of arithmetic operations including multiplication and division in integers modulo p such as the elliptic curve cryptosystem, it is possible to realize a shorter overall processing time.

It is also to be noted that the above described embodiments according to the present invention may be conveniently implemented using conventional general purpose digital computers programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the Montgomery division device and Montgomery inverse calculation device in the above described configurations of FIG. 3, FIG. 6 and FIG. 13 can be conveniently implemented in forms of software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A Montgomery division device for computing a Montgomery division $Y=B \cdot A^{-1} \cdot 2^n \bmod N$ for a positive integer N, a positive integer A which is relatively prime with respect to N and satisfying $0 \leq A < N$, a positive integer B, and an integer n which is satisfying $n \geq L$ where L is a bit length of N in binary expression, the device comprising:

a Montgomery inverse calculation unit for obtaining a Montgomery inverse $X=A^{-1} \cdot 2^{2n} \bmod N$ from inputs A and N; and a Montgomery multiplication unit for obtaining the Montgomery division $Y=B \cdot X \cdot 2^{-n} \bmod N$ from the Montgomery inverse X obtained by the Montgomery inverse calculation unit and inputs B and N.

2. The device of claim 1, wherein the Montgomery inverse calculation unit includes:

an inverse calculation unit for obtaining an intermediate result $C=A^{-1} \cdot 2^k \bmod N$ and a parameter k satisfying $L \leq k \leq 2L$ from inputs A and N; and an inverse correction unit for obtaining the Montgomery inverse $X=C \cdot 2^{2n-k} \bmod N$ from the intermediate result C and the parameter k obtained by the inverse calculation unit and input N.

3. A Montgomery division device for computing a Montgomery division $Y=B \cdot A^{-1} \cdot 2^n \bmod N$ for a positive integer N, a positive integer A which is relatively prime with respect to N and satisfying $0 \leq A < N$, a positive integer B, and an integer n which is satisfying $n \geq L$ where L is a bit length of N in binary expression, the device comprising:

an inverse calculation unit for obtaining a first intermediate result $C=A^{-1} \cdot 2^k \bmod N$ and a parameter k satisfying $L \leq k \leq 2L$ from inputs A and N;

a Montgomery multiplication unit for obtaining a second intermediate result $D=B \cdot C \cdot 2^{-n} \bmod N$ from the first intermediate result C obtained by the inverse calculation unit and input B and N; and an inverse correction unit for obtaining the Montgomery division $Y=D \cdot 2^{2n-k} \bmod N$ from the second intermediate result D obtained by the Montgomery multiplication unit, the parameter k obtained by the inverse calculation unit and input N.

4. A Montgomery inverse calculation device for computing a Montgomery inverse $X=A^{-1} \cdot 2^{2n} \bmod N$ for a positive integer N, a positive integer A which is relatively prime with respect to N and satisfying $0 \leq A < N$, and an integer n which is satisfying $n \geq L$ where L is a bit length of N in binary expression, the device comprising:

an inverse calculation unit for obtaining an intermediate result $C=A^{-1} \cdot 2^k \bmod N$ and a parameter k satisfying $L \leq k \leq 2L$ from inputs A and N; and an inverse correction unit for obtaining the Montgomery inverse $X=C \cdot 2^{2n-k} \bmod N$ from the intermediate result C and the parameter k obtained by the inverse calculation unit and input N.

5. The device of claim 4, wherein the inverse calculation unit and the inverse correction unit are formed by:

a plurality of registers for internally registering intermediate variables;

a bit shifter for right/left shifting a value registered in each of said registers;

an adder/subtracter for adding/subtracting values registered in two of said registers; and a judgement unit for comparing values registered in two of said registers, and for judging a value of a specific bit position in each of said registers.

6. The device of claim 4, wherein the inverse calculation unit carries out an operation formed by:

an initialization processing for setting an initial state of U=N, V=A, T=0, S=1 and k=0 in binary expression for register values U, V, T, S and k;

a loop processing to be iterated while V>0, including:

a processing for right shifting U, left shifting S and incrementing k by one when a least significant bit of U is 0, and right shifting V, left shifting T and incrementing k by one when a least significant bit of V is 0;

a processing for subtracting V from U, right shifting U, adding S to T, left shifting S and incrementing k by one when a least significant bit of U is 1, a least significant bit of V is 1 and U>V; and a processing for subtracting U from V, right shifting V, adding T to S, left shifting T and incrementing k by one when a least significant bit of U is 1, a least significant bit of V is 1 and $U \leq V$; and a calculation processing to be carried out when V becomes equal to 0, for subtracting N from T and then setting the intermediate result C to be a value obtained by subtracting T from N when $T \geq N$, or setting the intermediate result C to be a value obtained by subtracting T from N when T<N.

7. The device of claim 4, wherein the inverse calculation unit carries out an operation formed by:

an initialization processing for setting an initial state of U=N, V=A, T=0, S=1 and k=0 in binary expression for register values U, V, T, S and k;

a loop processing to be iterated while V>0, including:

a processing for right shifting U by w1 bits, left shifting S by w1 bits and incrementing k by w1 when w1 is not zero, where w1 is a bit length of consecutive 0 from a least significant bit of U, and right shifting V by w2 bits, left shifting T by w2 bits and incrementing k by w2 when w2 is not zero, where w2 is a bit length of consecutive 0 from a least significant bit of V;

a processing for subtracting V from U, right shifting U, adding S to T, left shifting S and incrementing k by one when w1 is zero, w2 is zero and U>V; and a processing for subtracting U from V, right shifting V, adding T to S, left shifting T and incrementing k by one when w1 is zero, w2 is zero and U$\leq$V; and a calculation processing to be carried out when V becomes equal to 0, for subtracting N from T and then setting the intermediate result C to be a value obtained by subtracting T from N when T$\geq$N, or setting the intermediate result C to be a value obtained by subtracting T from N when T<N.

8. The device of claim 4, wherein the inverse calculation unit carries out an operation formed by:

an initialization processing for setting an initial state of U=N, V=A, T=0, S=1 and k=0 in binary expression for register values U, V, T, S and k;

a loop processing to be iterated while V>0, including:

a processing for right shifting U by w1 bits, left shifting S by w1 bits and incrementing k by w1 when w1 is not zero, where w1 is a bit length of consecutive 0 from a least significant bit of U, and right shifting V by w2 bits, left shifting T by w2 bits and incrementing k by w2 when w2 is not zero, where w2 is a bit length of consecutive 0 from a least significant bit of V;

a processing for subtracting V from U, right shifting U by w3 bits, adding S to T, left shifting S by w3 bits and incrementing k by w3 when w1 is zero, w2 is zero and U>V, where w3 is a bit length of consecutive 0 from a least significant bit of a value obtained by subtracting V from U; and a processing for subtracting U from V, right shifting V by w4 bits, adding T to S, left shifting T by w4 bits and incrementing k by w4 when w1 is zero, w2 is zero and U$\leq$V, where w4 is a bit length of consecutive 0 from a least significant bit of a value obtained by subtracting U from V; and a calculation processing to be carried out when V becomes equal to 0, for subtracting N from T and then setting the intermediate result C to be a value obtained by subtracting T from N when T$\geq$N, or setting the intermediate result C to be a value obtained by subtracting T from N when T<N.

9. The device of claim 4, wherein the inverse correction unit carries out an operation formed by:

an initialization processing for setting an initial state of i=0 for a register value i and setting the intermediate result C obtained by the inverse calculation unit to a register value T;

a loop processing to be iterated while i<2n−k, for left shifting T, and then subtracting N from T and incrementing i by one when T$\geq$N or incrementing i by one when T<N; and a calculation processing for setting the Montgomery inverse X to be a value of T obtained by the loop processing when i becomes equal to 2n−k.

10. The device of claim 4, wherein the inverse correction unit carries out an operation formed by:

an initialization processing for setting an initial state of i=0 for a register value i and setting the intermediate result C obtained by the inverse calculation unit to a register value T;

a loop processing to be iterated while i<2n−k, including:

a processing for left shifting T by one bit, subtracting N from T and incrementing i by one when w1 is zero, where w1 is a bit length of consecutive 0 from a most significant bit of T, a processing for setting w2 to be 2n−k−i, left shifting T by w2 bits and setting i to be 2n−k when w1 is not zero and i+w1>2n−k;

a processing for left shifting T by w1 bits, and then subtracting N from T and incrementing i by w1 when T$\geq$N or incrementing i by w1 when T<N; and a calculation processing for setting the Montgomery inverse X to be a value of T obtained by the loop processing when i becomes equal to 2n−k.

11. The device of claim 4, wherein the inverse calculation unit and the inverse correction unit are formed by:

a U register for registering a register value U which is initially set to be N;

a V register for registering a register value V which is initially set to be A;

a T register for registering a register value T which is initially set to be 0;

an S register for registering a register value S which is initially set to be 1;

a k register for registering a register value k which is initially set to be 0;

a bit shifter for carrying out a right shifting of U, a right shifting of V, the left shifting of T, and a left shifting of S;

an adder/subtracter for carrying out a subtraction of V from U, a subtraction of U from V, an addition of S to T, an addition of T to S, a subtraction of N from T, a subtraction of T from N, and an addition of 1 to k;

a judgement unit for judging whether a least significant bit of U is 0 or not, whether a least significant bit of V is 0 or not, whether V is 0 or not, and whether T is greater than or equal to N or not; and a control unit for controlling the bit shifter, the adder/subtractor, and the judgement unit.

12. A method for computing a Montgomery division $Y=B \cdot A^{-1} \cdot 2^n$ mod N for a positive integer N, a positive integer A which is relatively prime with respect to N and satisfying $0 \leq A < N$, a positive integer B, and an integer n which is satisfying $n \geq L$ where L is a bit length of N in binary expression, the method comprising the steps of:

(a) obtaining a Montgomery inverse $X = A^{-1} \cdot 2^{2n}$ mod N from inputs A and N; and (b) obtaining the Montgomery division $Y = B \cdot X \cdot 2^{-n}$ mod N from the Montgomery inverse X obtained by the step (a) and inputs B and N.

13. The method of claim 12, wherein the step (a) includes the steps of:

(a1) obtaining an intermediate result $C = A^{-1} \cdot 2^k$ mod N and a parameter k satisfying $L \leq k \leq 2L$ from inputs A and N; and (a2) obtaining the Montgomery inverse $X = C \cdot 2^{2n-k}$ mod N from the intermediate result C and the parameter k obtained by the step (a1) and input N.

14. A method for computing a Montgomery division $Y = B \cdot A^{-1} \cdot 2^n$ mod N for a positive integer N, a positive integer A which is relatively prime with respect to N and satisfying $0 \leq A \leq N$, a positive integer B, and an integer n which is satisfying $n \geq L$ where L is a bit length of N in binary expression, the method comprising the steps of:

(a) obtaining a first intermediate result $C = A^{-1} \cdot 2^k \mod N$ and a parameter k satisfying $L \leq k \leq 2L$ from inputs A and N;

(b) obtaining a second intermediate result $D = B \cdot C \cdot 2^{-n} \mod N$ from the first intermediate result C obtained by the step (a) and input B and N; and (c) obtaining the Montgomery division $Y = D \cdot 2^{2n-k} \mod N$ from the second intermediate result D obtained by the step (b), the parameter k obtained by the step (a) and input N.

15. A method for computing a Montgomery inverse $X = A^{-1} \cdot 2^{2n} \mod N$ for a positive integer N, a positive integer A which is relatively prime with respect to N and satisfying $0 \leq A < N$, and an integer n which is satisfying $n \geq L$ where L is a bit length of N in binary expression, the method comprising the steps of:

(a) obtaining an intermediate result $C = A^{-1} \cdot 2^k \mod N$ and a parameter k satisfying $L \leq k \leq 2L$ from inputs A and N; and (b) obtaining the Montgomery inverse $X = C \cdot 2^{2n-k} \mod N$ from the intermediate result C and the parameter k obtained by the step (a) and input N.

16. The method of claim 15, wherein the step (a) carries out an operation formed by:

an initialization processing for setting an initial state of $U=N$, $V=A$, $T=0$, $S=1$ and $k=0$ in binary expression for register values U, V, T, S and k;

a loop processing to be iterated while $V>0$, including:
  a processing for right shifting U, left shifting S and incrementing k by one when a least significant bit of U is 0, and right shifting V, left shifting T and incrementing k by one when a least significant bit of V is 0;
  a processing for subtracting V from U, right shifting U, adding S to T, left shifting S and incrementing k by one when a least significant bit of U is 1, a least significant bit of V is 1 and $U>V$; and
  a processing for subtracting U from V, right shifting V, adding T to S, left shifting T and incrementing k by one when a least significant bit of U is 1, a least significant bit of V is 1 and $U \leq V$; and a calculation processing to be carried out when V becomes equal to 0, for subtracting N from T and then setting the intermediate result C to be a value obtained by subtracting T from N when $T \geq N$, or setting the intermediate result C to be a value obtained by subtracting T from N when $T<N$.

17. The method of claim 15, wherein the step (a) carries out an operation formed by:

an initialization processing for setting an initial state of $U=N$, $V=A$, $T=0$, $S=1$ and $k=0$ in binary expression for register values U, V, T, S and k;

a loop processing to be iterated while $V>0$, including:
  a processing for right shifting U by w1 bits, left shifting S by w1 bits and incrementing k by w1 when w1 is not zero, where w1 is a bit length of consecutive 0 from a least significant bit of U, and right shifting V by w2 bits, left shifting T by w2 bits and incrementing k by w2 when w2 is not zero, where w2 is a bit length of consecutive 0 from a least significant bit of V;
  a processing for subtracting V from U, right shifting U, adding S to T, left shifting S and incrementing k by one when w1 is zero, w2 is zero and $U>V$; and
  a processing for subtracting U from V, right shifting V, adding T to S, left shifting T and incrementing k by one when w1 is zero, w2 is zero and $U \leq V$; and a calculation processing to be carried out when V becomes equal to 0, for subtracting N from T and then setting the intermediate result C to be a value obtained by subtracting T from N when $T \geq N$, or setting the intermediate result C to be a value obtained by subtracting T from N when $T<N$.

18. The method of claim 15, wherein the step (a) carries out an operation formed by:

an initialization processing for setting an initial state of $U=N$, $V=A$, $T=0$, $S=1$ and $k=0$ in binary expression for register values U, V, T, S and k;

a loop processing to be iterated while $V>0$, including:
  a processing for right shifting U by w1 bits, left shifting S by w1 bits and incrementing k by w1 when w1 is not zero, where w1 is a bit length of consecutive 0 from a least significant bit of U, and right shifting V by w2 bits, left shifting T by w2 bits and incrementing k by w2 when w2 is not zero, where w2 is a bit length of consecutive 0 from a least significant bit of V;
  a processing for subtracting V from U, right shifting U by w3 bits, adding S to T, left shifting S by w3 bits and incrementing k by w3 when w1 is zero, w2 is zero and $U>V$, where w3 is a bit length of consecutive 0 from a least significant bit of a value obtained by subtracting V from U; and
  a processing for subtracting U from V, right shifting V by w4 bits, adding T to S, left shifting T by w4 bits and incrementing k by w4 when w1 is zero, w2 is zero and $U \leq V$, where w4 is a bit length of consecutive 0 from a least significant bit of a value obtained by subtracting U from V; and a calculation processing to be carried out when V becomes equal to 0, for subtracting N from T and then setting the intermediate result C to be a value obtained by subtracting T from N when $T \geq N$, or setting the intermediate result C to be a value obtained by subtracting T from N when $T<N$.

19. The method of claim 15, wherein the step (b) carries out an operation formed by:

an initialization processing for setting an initial state of $i=0$ for a register value i and setting the intermediate result C obtained by the inverse calculation unit to a register value T;

a loop processing to be iterated while $i<2n-k$, for left shifting T, and then subtracting N from T and incrementing i by one when $T \geq N$ or incrementing i by one when $T<N$; and a calculation processing for setting the Montgomery inverse X to be a value of T obtained by the loop processing when i becomes equal to $2n-k$.

20. The method of claim 15, wherein the step (b) carries out an operation formed by:

an initialization processing for setting an initial state of $i=0$ for a register value i and setting the intermediate result C obtained by the inverse calculation unit to a register value T;

a loop processing to be iterated while $i<2n-k$, including:
  a processing for left shifting T by one bit, subtracting N from T and incrementing i by one when w1 is zero, where w1 is a bit length of consecutive 0 from a most significant bit of T,
  a processing for setting w2 to be $2n-k-i$, left shifting T by w2 bits and setting i to be $2n-k$ when w1 is not zero and $i+w1>2n-k$;

a processing for left shifting T by w1 bits, and then subtracting N from T and incrementing i by w1 when $T \geq N$ or incrementing i by w1 when $T<N$; and a calculation processing for setting the Montgomery inverse X to be a value of T obtained by the loop processing when i becomes equal to $2n-k$.

21. An article of manufacture, comprising:

a computer usable medium having computer readable program code means embodied therein for causing a computer to function as a system for computing a Montgomery division $Y=B \cdot A^{-1} \cdot 2^n$ mod N for a positive integer N, a positive integer A which is relatively prime with respect to N and satisfying $0 \leq A<N$, a positive integer B, and an integer n which is satisfying $n \geq L$ where L is a bit length of N in binary expression, the computer readable program code means includes:

first computer readable program code means for causing said computer to obtain a Montgomery inverse $X=A^{-1} \cdot 2^{2n}$ mod N from inputs A and N; and second computer readable program code means for causing said computer to obtain the Montgomery division $Y=B \cdot X \cdot 2^{-n}$ mod N from the Montgomery inverse X obtained by the first computer readable program code means and inputs B and N.

22. The article of manufacture of claim 21, wherein the first computer readable program code means includes:

first computer readable sub-program code means for causing said computer to obtain an intermediate result $C=A^{-1} \cdot 2^k$ mod N and a parameter k satisfying $L \leq k \leq 2L$ from inputs A and N; and second computer readable sub-program code means for causing said computer to obtain the Montgomery inverse $X=C \cdot 2^{2n-k}$ mod N from the intermediate result C and the parameter k obtained by the first computer readable sub-program code means and input N.

23. An article of manufacture, comprising:

a computer usable medium having computer readable program code means embodied therein for causing a computer to function as a system for computing a Montgomery division $Y=B \cdot A^{-1} \cdot 2^n$ mod N for a positive integer N, a positive integer A which is relatively prime with respect to N and satisfying $0 \leq A<N$, a positive integer B, and an integer n which is satisfying $n \geq L$ where L is a bit length of N in binary expression, the computer readable program code means includes:

first computer readable program code means for causing said computer to obtain a first intermediate result $C=A^{-1} \cdot 2^k$ mod N and a parameter k satisfying $L \leq k \leq 2L$ from inputs A and N;

second computer readable program code means for causing said computer to obtain a second intermediate result $D=B \cdot C \cdot 2^{-n}$ mod N from the first intermediate result C obtained by the first computer readable program code means and input B and N; and third computer readable program code means for causing said computer to obtain the Montgomery division $Y=D \cdot 2^{2n-k}$ mod N from the second intermediate result D obtained by the second computer readable program code means, the parameter k obtained by the first computer readable program code means and input N.

24. An article of manufacture, comprising:

a computer usable medium having computer readable program code means embodied therein for causing a computer to function as a system for computing a Montgomery inverse $X=A^{-1} \cdot 2^{2n}$ mod N for a positive integer N, a positive integer A which is relatively prime with respect to N and satisfying $0 \leq A<N$, and an integer n which is satisfying $n \geq L$ where L is a bit length of N in binary expression, the computer readable program code means includes:

first computer readable program code means for causing said computer to obtain an intermediate result $C=A^{-1} \cdot 2^k$ mod N and a parameter k satisfying $L \leq k \leq 2L$ from inputs A and N; and second computer readable program code means for causing said computer to obtain the Montgomery inverse $X=C \cdot 2^{2n-k}$ mod N from the intermediate result C and the parameter k obtained by the first computer readable program code means and input N.

25. The article of manufacture of claim 24, wherein the first computer readable program code means carries out an operation formed by:

an initialization processing for setting an initial state of $U=N$, $V=A$, $T=0$, $S=1$ and $k=0$ in binary expression for register values U, V, T, S and k;

a loop processing to be iterated while $V>0$, including:

a processing for right shifting U, left shifting S and incrementing k by one when a least significant bit of U is 0, and right shifting V, left shifting T and incrementing k by one when a least significant bit of V is 0;

a processing for subtracting V from U, right shifting U, adding S to T, left shifting S and incrementing k by one when a least significant bit of U is 1, a least significant bit of V is 1 and $U>V$; and a processing for subtracting U from V, right shifting V, adding T to S, left shifting T and incrementing k by one when a least significant bit of U is 1, a least significant bit of V is 1 and $U \leq V$; and a calculation processing to be carried out when V becomes equal to 0, for subtracting N from T and then setting the intermediate result C to be a value obtained by subtracting T from N when $T \geq N$, or setting the intermediate result C to be a value obtained by subtracting T from N when $T<N$.

26. The article of manufacture of claim 24, wherein the first computer readable program code means carries out an operation formed by:

an initialization processing for setting an initial state of $U=N$, $V=A$, $T=0$, $S=1$ and $k=0$ in binary expression for register values U, V, T, S and k;

a loop processing to be iterated while $V>0$, including:

a processing for right shifting U by w1 bits, left shifting S by w1 bits and incrementing k by w1 when w1 is not zero, where w1 is a bit length of consecutive 0 from a least significant bit of U, and right shifting V by w2 bits, left shifting T by w2 bits and incrementing k by w2 when w2 is not zero, where w2 is a bit length of consecutive 0 from a least significant bit of V;

a processing for subtracting V from U, right shifting U, adding S to T, left shifting S and incrementing k by one when w1 is zero, w2 is zero and $U>V$; and a processing for subtracting U from V, right shifting V, adding T to S, left shifting T and incrementing k by one when w1 is zero, w2 is zero and $U \leq V$; and a calculation processing to be carried out when V becomes equal to 0, for subtracting N from T and then setting the intermediate result C to be a value obtained by subtracting T from N when $T \geq N$, or setting the intermediate result C to be a value obtained by subtracting T from N when T<N.

27. The article of manufacture of claim 24, wherein the first computer readable program code means carries out an operation formed by:

an initialization processing for setting an initial state of U=N, V=A, T=0, S=1 and k=0 in binary expression for register values U, V, T, S and k;

a loop processing to be iterated while V>0, including:

a processing for right shifting U by w1 bits, left shifting S by w1 bits and incrementing k by w1 when w1 is not zero, where w1 is a bit length of consecutive 0 from a least significant bit of U, and right shifting V by w2 bits, left shifting T by w2 bits and incrementing k by w2 when w2 is not zero, where w2 is a bit length of consecutive 0 from a least significant bit of V;

a processing for subtracting V from U, right shifting U by w3 bits, adding S to T, left shifting S by w3 bits and incrementing k by w3 when w1 is zero, w2 is zero and U>V, where w3 is a bit length of consecutive 0 from a least significant bit of a value obtained by subtracting V from U; and a processing for subtracting U from V, right shifting V by w4 bits, adding T to S, left shifting T by w4 bits and incrementing k by w4 when w1 is zero, w2 is zero and U≦V, where w4 is a bit length of consecutive 0 from a least significant bit of a value obtained by subtracting U from V; and a calculation processing to be carried out when V becomes equal to 0, for subtracting N from T and then setting the intermediate result C to be a value obtained by subtracting T from N when T≧N, or setting the intermediate result C to be a value obtained by subtracting T from N when T<N.

28. The article of manufacture of claim 24, wherein the second computer readable program code means carries out an operation formed by:

an initialization processing for setting an initial state of i=0 for a register value i and setting the intermediate result C obtained by the inverse calculation unit to a register value T;

a loop processing to be iterated while i<2n−k, for left shifting T, and then subtracting N from T and incrementing i by one when T≧N or incrementing i by one when T<N; and a calculation processing for setting the Montgomery inverse X to be a value of T obtained by the loop processing when i becomes equal to 2n−k.

29. The article of manufacture of claim 24, wherein the second computer readable program code means carries out an operation formed by:

an initialization processing for setting an initial state of i=0 for a register value i and setting the intermediate result C obtained by the inverse calculation unit to a register value T;

a loop processing to be iterated while i<2n−k, including:

a processing for left shifting T by one bit, subtracting N from T and incrementing i by one when w1 is zero, where w1 is a bit length of consecutive 0 from a most significant bit of T;

a processing for setting w2 to be 2n−k−i, left shifting T by w2 bits and setting i to be 2n−k when w1 is not zero and i+w1>2n−k;

a processing for left shifting T by w1 bits, and then subtracting N from T and incrementing i by w1 when T≧N or incrementing i by w1 when T<N; and a calculation processing for setting the Montgomery inverse X to be a value of T obtained by the loop processing when i becomes equal to 2n−k.

30. A method for implementing basic operations of an elliptic curve cryptosystem, comprising the steps of:

converting parameters of the basic operations of the elliptic curve cryptosystem from Zp, integers modulo p, over which elliptic curves are defined, into a Montgomery space;

executing the basic operations of the elliptic curve cryptosystem on input data of the elliptic curve cryptosystem in terms of Montgomery arithmetic system operations defined on the Montgomery space using the parameters converted by the converting step; and inversely converting operation results of the basic operations of the elliptic curve cryptosystem obtained by the executing step from the Montgomery space into Zp so as to obtain output data of the elliptic curve cryptosystem.

31. The method of claim 30, wherein the Montgomery arithmetic system includes calculation of a Montgomery inverse $X=A^{-1} \cdot 2^{2n}$ mod p for a positive integer A which is relatively prime with respect to p and satisfying 0≦A<p, and an integer n which is satisfying n≧L where L is a bit length of p in binary expression, by the steps of:

(a) obtaining an intermediate result $C=A^{-1} \cdot 2^k$ mod p and a parameter k satisfying L≦k≦2L from inputs A and p; and (b) obtaining the Montgomery inverse $X=C \cdot 2^{2n-k}$ mod p from the intermediate result C and the parameter k obtained by the step (a) and input p.

32. The method of claim 30, wherein the Montgomery arithmetic system includes calculation of a Montgomery division $Y=B \cdot A^{-1} \cdot 2^n$ mod p for a positive integer A which is relatively prime with respect to p and satisfying 0≦A<p, a positive integer B, and an integer n which is satisfying n≧L where L is a bit length of p in binary expression, by the steps of:

(a) obtaining a Montgomery inverse $X=A^{-1} \cdot 2^{2n}$ mod p from inputs A and p; and (b) obtaining the Montgomery division $Y=B \cdot X \cdot 2^{-n}$ mod p from the Montgomery inverse X obtained by the step (a) and inputs B and p.

33. The method of claim 32, wherein the step (a) includes the steps of:

(a1) obtaining an intermediate result $C=A^{-1} \cdot 2^k$ mod p and a parameter k satisfying L≦k≦2L from inputs A and p; and (a2) obtaining the Montgomery inverse $X=C \cdot 2^{2n-k}$ mod p from the intermediate result C and the parameter k obtained by the step (a1) and input p.

34. The method of claim 30, wherein the Montgomery arithmetic system includes calculation of a Montgomery division $Y=B \cdot A^{-1} \cdot 2^n$ mod p for a positive integer A which is relatively prime with respect to p and satisfying 0≦A<p, a positive integer B, and an integer n which is satisfying n≧L where L is a bit length of p in binary expression, by the steps of:

(a) obtaining a first intermediate result $C=A^{-1} \cdot 2^k$ mod p and a parameter k satisfying L≦k≦2L from inputs A and p;

(b) obtaining a second intermediate result $D=B \cdot C \cdot 2^{-n}$ mod p from the first intermediate result C obtained by the step (a) and input B and p; and (c) obtaining the Montgomery division $Y=D \cdot 2^{2n-k}$ mod p from the second intermediate result D obtained by the step (b), the parameter k obtained by the step (a) and input p.

35. The method of claim 30, wherein the Montgomery arithmetic system includes addition, subtraction, and multiplication in the Montgomery space in a case where the basic operations include addition of the elliptic curves using projective coordinates.

36. The method of claim 30, wherein the Montgomery arithmetic system includes addition, subtraction, multiplication, and division in the Montgomery space, in a case where the basic operations include addition of the elliptic curves using affine coordinates.

37. A method for implementing basic operations of an elliptic curve cryptosystem, comprising the steps of:

defining parameters of the basic operations of the elliptic curve cryptosystem in a Montgomery space over which elliptic curves are defined; and executing the basic operations of the elliptic curve cryptosystem on input data of the elliptic curve cryptosystem in terms of Montgomery arithmetic system operations defined on the Montgomery space using the parameters defined by the defining step so as to obtain output data of the elliptic curve cryptosystem given by operation results for the basic operations of the elliptic curve cryptosystem in the Montgomery space.

38. The method of claim 37, wherein the Montgomery arithmetic system includes calculation of a Montgomery inverse $X=A^{-1} \cdot 2^{2n}$ mod p for a positive integer A which is relatively prime with respect to p and satisfying $0 \leq A<p$, and an integer n which is satisfying $n \geq L$ where L is a bit length of p in binary expression, by the steps of:

(a) obtaining an intermediate result $C=A^{-1} \cdot 2^k$ mod p and a parameter k satisfying $L \leq k \leq 2L$ from inputs A and p; and (b) obtaining the Montgomery inverse $X=C \cdot 2^{2n-k}$ mod p from the intermediate result C and the parameter k obtained by the step (a) and input p.

39. The method of claim 37, wherein the Montgomery arithmetic system includes calculation of a Montgomery division $Y=B \cdot A^{-1} \cdot 2^n$ mod p for a positive integer A which is relatively prime with respect to p and satisfying $0 \leq A<p$, a positive integer B, and an integer n which is satisfying $n \geq L$ where L is a bit length of p in binary expression, by the steps of:

(a) obtaining a Montgomery inverse $X=A^{-1} \cdot 2^{2n}$ mod p from inputs A and p; and (b) obtaining the Montgomery division $Y=B \cdot X \cdot 2^{-n}$ mod p from the Montgomery inverse X obtained by the step (a) and inputs B and p.

40. The method of claim 39, wherein the step (a) includes the steps of:

(a1) obtaining an intermediate result $C=A^{-1} \cdot 2^k$ mod p and a parameter k satisfying $L \leq k \leq 2L$ from inputs A and p; and (a2) obtaining the Montgomery inverse $X=C \cdot 2^{2n-k}$ mod p from the intermediate result C and the parameter k obtained by the step (a1) and input p.

41. The method of claim 37, wherein the Montgomery arithmetic system includes calculation of a Montgomery division $Y=B \cdot A^{-1} \cdot 2^n$ mod p for a positive integer A which is relatively prime with respect to p and satisfying $0 \leq A<p$, a positive integer B, and an integer n which is satisfying $n \geq L$ where L is a bit length of p in binary expression, by the steps of:

(a) obtaining a first intermediate result $C=A^{-1} \cdot 2^k$ mod p and a parameter k satisfying $L \leq k \leq 2L$ from inputs A and p;

(b) obtaining a second intermediate result $D=B \cdot C \cdot 2^{-n}$ mod p from the first intermediate result C obtained by the step (a) and input B and p; and (c) obtaining the Montgomery division $Y=D \cdot 2^{2n-k}$ mod p from the second intermediate result D obtained by the step (b), the parameter k obtained by the step (a) and input p.

42. The method of claim 37, wherein the Montgomery arithmetic system includes addition, subtraction, and multiplication in the Montgomery space in a case where the basic operations include addition of the elliptic curves using projective coordinates.

43. The method of claim 37, wherein the Montgomery arithmetic system includes addition, subtraction, multiplication, and division in the Montgomery space in a case where the basic operations include addition of the elliptic curves using affine coordinates.

* * * * *